United States Patent
Yang et al.

(10) Patent No.: US 11,985,238 B2
(45) Date of Patent: May 14, 2024

(54) VEHICLE-MOUNTED DEVICE UPGRADE METHOD AND RELATED DEVICE

(71) Applicant: Huawei International Pte. Ltd., Singapore (SG)

(72) Inventors: Yanjiang Yang, Singapore (SG); Zhuo Wei, Singapore (SG); Hsiao-Ying Lin, Singapore (SG); He Wei, Shenzhen (CN); Junqiang Shen, Shenzhen (CN)

(73) Assignee: Huawei International Pte. Ltd., Singapore (SG)

( * ) Notice: Subject to any disclaimer, the term of this patent is extended or adjusted under 35 U.S.C. 154(b) by 699 days.

(21) Appl. No.: 17/085,878

(22) Filed: Oct. 30, 2020

(65) Prior Publication Data
US 2021/0051000 A1 Feb. 18, 2021

Related U.S. Application Data

(63) Continuation of application No. PCT/SG2018/050207, filed on Apr. 30, 2018.

(51) Int. Cl.
*G06F 21/00* (2013.01)
*G06F 8/65* (2018.01)
(Continued)

(52) U.S. Cl.
CPC ............... *H04L 9/088* (2013.01); *G06F 8/65* (2013.01)

(58) Field of Classification Search
None
See application file for complete search history.

(56) References Cited

U.S. PATENT DOCUMENTS

| | | |
|---|---|---|
| 9,529,580 B2 | 12/2016 | Vangelov et al. |
| 2009/0300595 A1 | 12/2009 | Moran et al. |

(Continued)

FOREIGN PATENT DOCUMENTS

| | | | |
|---|---|---|---|
| CN | 102158544 A | | 8/2011 |
| CN | 104468784 | * | 3/2015 |

(Continued)

OTHER PUBLICATIONS

Mansor et al., "Don't Brick Your Car: Firmware Confidentiality and Rollback for Vehicles," 2015 10th International Conference on Availability, Reliability and Security, pp. 139-148 (2015).

(Continued)

*Primary Examiner* — Lisa C Lewis
(74) *Attorney, Agent, or Firm* — Leydig, Voit & Mayer, Ltd.

(57) ABSTRACT

Embodiments disclose a vehicle-mounted device upgrade method and a related device. The method may be applied to an intelligent vehicle, the intelligent vehicle includes a vehicle-mounted control device, and the method may include: receiving, by the vehicle-mounted control device, a first partial key sent by the communications device; restoring, by the vehicle-mounted control device, a first key by using the first partial key and a second partial key that is stored on the vehicle-mounted control device; and performing, by the vehicle-mounted control device, secure processing on a first upgrade file by using the first key, to obtain the securely processed first upgrade file, where the secure processing includes generating first message authentication code (MAC), and the securely processed first upgrade file includes the first upgrade file and the first MAC. According to this application, the vehicle-mounted device can be securely and efficiently upgraded.

18 Claims, 14 Drawing Sheets

(51) Int. Cl.
*H04L 9/08* (2006.01)
*H04L 29/06* (2006.01)

(56) References Cited

U.S. PATENT DOCUMENTS

2011/0320089 A1   12/2011  Lewis
2015/0230044 A1    8/2015  Paun

FOREIGN PATENT DOCUMENTS

| | | |
|---|---|---|
| CN | 104468784 A | 3/2015 |
| CN | 106257416 A | 12/2016 |
| CN | 107026833 A | 8/2017 |
| DE | 102014205306 A1 | 9/2015 |
| JP | 2015164774 A | 9/2015 |
| JP | 2017046038 A | 3/2017 |
| JP | 2018014770 A | 1/2018 |
| JP | 2018026866 A | 2/2018 |
| JP | 2018026886 * | 2/2018 |
| WO | 2016183096 A1 | 11/2016 |

OTHER PUBLICATIONS

McKenna et al., "Making Full Vehicle OTA Updates a Reality," Whitepaper, NXP, total 18 pages (2016).
Lopez et al., "TR-0026 Vehicular_Domain_Enablement_Clause_9_2_Security," total 3 pages (Nov. 29, 2016).

* cited by examiner

VEHICLE-MOUNTED DEVICE UPGRADE METHOD AND RELATED DEVICE

CROSS-REFERENCE TO RELATED APPLICATIONS

This application is a continuation of International Application No. PCT/SG2018/050207, filed on Apr. 30, 2018, the disclosure of which is hereby incorporated by reference in its entirety.

TECHNICAL FIELD

This application relates to the field of vehicle-mounted technologies, and in particular, to a vehicle-mounted device upgrade method and a related device.

BACKGROUND

In the future, each vehicle is a network node on the internet of vehicles and is substantially the same as a web-connected device such as a computer or a mobile phone. It is estimated that 60% to 70% of vehicle recalls in North America are due to firmware/software issues. Therefore, upgrading firmware/software of vehicle-mounted devices is essential. Traditionally, firmware/software of a to-be-upgraded vehicle-mounted device is upgraded through a vehicle recall, which has disadvantages of high cost and a long cycle.

In view of this, in the future, a vehicle-mounted device is to be upgraded in a more flexible remote upgrade manner, that is, an over-the-air (OTA) technology, as a current computer and mobile phone are remotely upgraded. Remote firmware/software upgrade for a vehicle-mounted device may bring many benefits. For example, this helps quickly fix critical firmware/software bugs, improves vehicle safety, and adds a new function or feature in a timely manner to a vehicle throughout a service life. In addition, firmware/software can be upgraded through the OTA technology without a vehicle recall. This greatly reduces costs for a vehicle manufacturer or retailer and brings convenience to a vehicle user.

However, in a remote upgrade process of an intelligent vehicle, there may be some safety risks. For example, an upgrade file and a secure processing key in the intelligent vehicle are stolen without authorization or tampered with. All these may cause an upgrade failure or abnormality of a vehicle-mounted device, and ultimately endanger driving safety of a user. Therefore, how to ensure secure and efficient firmware/software upgrade for the vehicle-mounted device becomes an urgent problem to be resolved.

SUMMARY

Embodiments of the present disclosure provide a vehicle-mounted device upgrade method and a related device, to resolve a problem with secure and efficient firmware/software upgrade for a vehicle-mounted device.

According to a first aspect, an embodiment of the present disclosure provides a vehicle-mounted device upgrade method, applied to a vehicle upgrade system. The vehicle upgrade system includes an intelligent vehicle and a communications device, the intelligent vehicle includes a vehicle-mounted control device, and the method includes the following steps.

The vehicle-mounted control device receives a first partial key sent by the communications device. The vehicle-mounted control device restores a first key by using the first partial key and a second partial key that is stored on the vehicle-mounted control device. The vehicle-mounted control device performs secure processing on a first upgrade file by using the first key, to obtain the securely processed first upgrade file. The secure processing includes generating first message authentication code (MAC), and the securely processed first upgrade file includes the first upgrade file and the first MAC. In this embodiment of the present disclosure, the communications device that matches the intelligent vehicle is added to an in-vehicle upgrade architecture, and is used as a carrier for separate storage of a secure key of the intelligent vehicle. When the vehicle-mounted control device in the intelligent vehicle performs secure processing on the upgrade file, the vehicle-mounted control device may obtain the partial key stored on the communications device to restore the key, and perform secure processing on the upgrade file by using the restored key. In this way, secure intra-vehicle storage and/or transmission of the upgrade file is ensured, and a case that the key is easily intercepted and tampered with by an unauthorized user due to only storage on the intelligent vehicle or the communications device is avoided. This ensures security of upgrade file storage or transmission in the intelligent vehicle. In addition, when the upgrade file is transmitted between the vehicle-mounted control device and a to-be-upgraded vehicle-mounted device in the intelligent vehicle, MAC of the upgrade file is generated and sent to the to-be-upgraded vehicle-mounted device via the first upgrade file. This ensures integrity of the upgrade file during intra-vehicle transmission, reduces a computation amount of intra-vehicle secure verification, and therefore improves upgrade efficiency.

In a possible implementation, the communications device is a terminal device that has established a matching relationship with the intelligent vehicle, or the communications device is a server that provides a specific service for the intelligent vehicle, and the upgrade package includes the first upgrade file. The embodiment of the present disclosure provides two different secure upgrade architectures. When the first partial key comes from a terminal device (e.g., a smartphone), the intelligent vehicle and the terminal device perform separate storage and management of a key, and implement secure intra-vehicle storage or transmission. When the first partial key comes from a server (optionally, a key server or a dedicated server), the intelligent vehicle and the server perform separate storage and management of a key, and implement secure intra-vehicle storage or transmission. This avoids a case that the key is easily intercepted and tampered with by an unauthorized user due to the key being stored on only one device, and therefore ensures security of upgrade file storage or transmission in the intelligent vehicle.

In a possible implementation, the intelligent vehicle further includes a first to-be-upgraded vehicle-mounted device, and the method further includes: the vehicle-mounted control device sends the securely processed first upgrade file to the first to-be-upgraded vehicle-mounted device. The first to-be-upgraded vehicle-mounted device performs, by using a second key that is stored on the vehicle-mounted control device, secure verification on the securely processed first upgrade file. The second key is a key that pre-matches the first key, and the secure verification is an inverse operation of the secure processing. If the verification succeeds, the first to-be-upgraded vehicle-mounted device performs upgrade based on the first upgrade file that is successfully verified. In this embodiment of the present disclosure, after restoring the first key by using partial keys that are separately stored, the vehicle-mounted control device performs secure processing on the upgrade file, to securely transmit the securely processed upgrade file to the corresponding to-be-upgraded vehicle-mounted device for secure upgrade. This ensures security of the upgrade file during transmission between the vehicle-mounted control device and the to-be-upgraded vehicle-mounted device in the intelligent vehicle.

In a possible implementation, the secure processing further includes encrypting the first upgrade file and the first MAC by using the first key, and the securely processed first upgrade file includes the first upgrade file and the first MAC that are encrypted by using the first key. In this embodiment of the present disclosure, during transmission of the upgrade file between the vehicle-mounted control device and the to-be-upgraded vehicle-mounted device in the intelligent vehicle, the MAC of the upgrade file is generated and carried in the first upgrade file, and the MAC and the first upgrade file are encrypted by using the first key. Then, the encrypted first upgrade file and the encrypted MAC are sent to the to-be-upgraded vehicle-mounted device. This ensures integrity of the upgrade file during intra-vehicle transmission, reduces a computation amount of intra-vehicle secure verification, and therefore improves upgrade efficiency. In addition, privacy of the upgrade file is further ensured, to avoid theft by an unauthorized user.

In a possible implementation, before the vehicle-mounted control device receives the first partial key sent by the communications device, the method further includes: the vehicle-mounted control device determines the first key and the second key, and sends the second key to the first to-be-upgraded vehicle-mounted device. In this embodiment of the present disclosure, before the first key on the intelligent vehicle is split and stored, the vehicle-mounted control device needs to first determine a key pair used in the vehicle, and send the key pair to the corresponding to-be-upgraded vehicle-mounted device. In this way, the vehicle-mounted control device performs secure processing on the upgrade file by using the first key negotiated with the to-be-upgraded vehicle-mounted device, and the to-be-upgraded vehicle-mounted device performs secure verification by using the negotiated and matched second key, to ensure intra-vehicle transmission security of the upgrade file.

In a possible implementation, before the vehicle-mounted control device receives the first partial key sent by the communications device, the method further includes: the vehicle-mounted control device splits the first key into the first partial key and the second partial key, and sends the first partial key to the communications device. In this embodiment of the present disclosure, before the first key on the intelligent vehicle is split and stored, the vehicle-mounted control device negotiates with the to-be-upgraded vehicle-mounted device about the first key and the second key. Then, the vehicle-mounted control device splits the first key, sends a part of the key to the matched communications device for storage, and stores the other part of the key, to avoid the key from being easily intercepted and tampered with at a time.

In a possible implementation, before the vehicle-mounted control device receives the first partial key sent by the communications device, the method further includes: the vehicle-mounted control device obtains an upgrade package. The upgrade package includes the first upgrade file. The vehicle-mounted control device performs secure verification on the upgrade package. When the verification succeeds, the vehicle-mounted control device requests the first partial key from the communications device. In this embodiment of the present disclosure, before obtaining partial key that is separately stored, the vehicle-mounted control device first needs to obtain the upgrade package including the upgrade file, and performs secure verification on the upgrade package. After the verification succeeds, the vehicle-mounted control device initiates a procedure of performing secure processing on the corresponding upgrade file and transmitting the upgrade file to the corresponding to-be-upgraded vehicle-mounted device. Only in this case, the vehicle-mounted control device requests, from the communications device, the partial key used to perform secure processing on the upgrade file. This avoids untimely obtaining of the first partial key when it is not determined whether the in-vehicle upgrade package is secure, to avoid unauthorized obtaining, and further improve security of in-vehicle upgrade.

In a possible implementation, the communications device includes a terminal device. Before the vehicle-mounted control device obtains the upgrade package, the method further includes: the vehicle-mounted control device sends a secure upgrade request to the communications device. The secure upgrade request includes an upgrade-related parameter of the intelligent vehicle. When the upgrade-related parameter meets a preset upgrade condition, the vehicle-mounted control device receives a first indication sent by the communications device. The first indication is used to trigger the vehicle-mounted control device to obtain the upgrade package from the terminal device or an upgrade server. In this embodiment of the present disclosure, only when the communications device determines, based on the upgrade-related parameter fed back by the vehicle-mounted control device in the intelligent vehicle, that the upgrade condition is currently met for the intelligent vehicle, the communications device indicates or triggers the vehicle-mounted control device in the intelligent vehicle to obtain the in-vehicle upgrade package, to improve a success rate of in-vehicle upgrade. It may be understood that the intelligent vehicle may obtain the upgrade package from the server, or may obtain a downloaded upgrade package from the communications device.

In a possible implementation, the method further includes: the vehicle-mounted control device and the communications device perform secure authentication on each other to establish a secure cooperation channel. That the vehicle-mounted control device receives the first partial key sent by the communications device includes: the vehicle-mounted control device receives, through the secure channel, the first partial key sent by the communications device. In this embodiment of the present disclosure, the secure channel is established between the vehicle-mounted control device and the matched communications device. In this way, subsequently, the first partial key request, a secure authentication request, and the like may be transmitted between the vehicle-mounted control device and the communications device through the secure channel, to further ensure secure transmission between the vehicle-mounted control device and the communications device.

In a possible implementation, the method further includes: after the first to-be-upgraded vehicle-mounted device is successfully upgraded, the vehicle-mounted control device indicates the communications device to update a rollback file of the first upgrade file; and/or after the first to-be-upgraded vehicle-mounted device fails to be upgraded, the vehicle-mounted control device obtains a rollback file of the first upgrade file from the communications device, and sends the rollback file to the first to-be-upgraded vehicle-mounted device for a rollback operation. In this embodiment of the present disclosure, the communications device may provide the rollback file of the upgrade file for the intelligent vehicle. Regardless of whether the to-be-upgraded vehicle-mounted device is successfully upgraded or not, the communications device performs a rollback operation on the current upgrade file, so that the to-be-upgraded vehicle-mounted device may refer to the rollback file during subsequent upgrade.

According to a second aspect, an embodiment of the present disclosure provides a vehicle-mounted device upgrade method, applied to a vehicle upgrade system. The vehicle upgrade system includes an intelligent vehicle and a communications device, the intelligent vehicle includes a vehicle-mounted control device, and the method may include the following steps.

The communications device sends a first partial key to the vehicle-mounted control device. The vehicle-mounted control device restores a first key by using the first partial key and a second partial key that is stored on the vehicle-mounted control device. The first key is used by the vehicle-mounted control device to perform secure processing on a first upgrade file, to obtain the securely processed first upgrade file. The secure processing further includes encrypting the first upgrade file and first MAC by using the first key. The securely processed first upgrade file includes the first upgrade file and the first MAC encrypted by using the first key. In this embodiment of the present disclosure, the communications device that matches the intelligent vehicle is added to an in-vehicle upgrade architecture, and is used as a carrier for separate storage of a secure key of the intelligent vehicle. When the vehicle-mounted control device in the intelligent vehicle performs secure processing on the upgrade file, the vehicle-mounted control device may obtain the partial key stored on the communications device to restore the key, and perform secure processing on the upgrade file by using the restored key. In this way, secure intra-vehicle storage and/or transmission of the upgrade file is ensured, and a case that the key is easily intercepted and tampered with by an unauthorized user due to only storage on the intelligent vehicle or the communications device is avoided. This ensures security of upgrade file storage or transmission in the intelligent vehicle.

In a possible implementation, the vehicle-mounted control device splits the first key into the first partial key and the second partial key. Before the communications device sends the first partial key to the vehicle-mounted control device, the method further includes: the communications device receives the first partial key sent by the vehicle-mounted control device. In this embodiment of the present disclosure, before the first key on the intelligent vehicle is split and stored, the vehicle-mounted control device negotiates with the to-be-upgraded vehicle-mounted device about the first key and the second key. Then, the vehicle-mounted control device splits the first key, sends a part of the key to the matched communications device for storage, and stores the other part of the key, to avoid the key from being easily intercepted and tampered with at a time.

In a possible implementation, before the communications device sends the first partial key to the vehicle-mounted control device, the method further includes: the communications device receives a first partial key request sent by the vehicle-mounted control device. The first partial key request is sent by the vehicle-mounted control device when secure verification performed by the vehicle-mounted control device on an upgrade package succeeds, and the upgrade package includes the first upgrade file. In this embodiment of the present disclosure, before obtaining partial key that is separately stored, the vehicle-mounted control device first needs to obtain the upgrade package including the upgrade file, and performs secure verification on the upgrade package. After the verification succeeds, the vehicle-mounted control device initiates a procedure of performing secure processing on the corresponding upgrade file and transmitting the upgrade file to the corresponding to-be-upgraded vehicle-mounted device. Only in this case, the vehicle-mounted control device requests, from the communications device, the partial key used to perform secure processing on the upgrade file. This avoids untimely obtaining of the first partial key when it is not determined whether the in-vehicle upgrade package is secure, to avoid unauthorized obtaining, and further improve security of in-vehicle upgrade.

In a possible implementation, the communications device includes a terminal device. Before the communications device receives the first partial key request sent by the vehicle-mounted control device, the method further includes: the communications device receives a secure upgrade request sent by the vehicle-mounted control device. The secure upgrade request includes an upgrade-related parameter of the intelligent vehicle. The communications device determines whether the upgrade-related parameter meets a preset upgrade condition. If the upgrade-related parameter meets the preset upgrade condition, the communications device sends a first indication to the vehicle-mounted control device. The first indication is used to trigger the vehicle-mounted control device to obtain the upgrade package from the terminal device or an upgrade server. In this embodiment of the present disclosure, only when the communications device determines, based on the upgrade-related parameter fed back by the vehicle-mounted control device in the intelligent vehicle, that the upgrade condition is currently met for the intelligent vehicle, the communications device indicates or triggers the vehicle-mounted control device in the intelligent vehicle to obtain the in-vehicle upgrade package, to improve a success rate of in-vehicle upgrade. It may be understood that the intelligent vehicle may obtain the upgrade package from the server, or may obtain a downloaded upgrade package from the communications device.

In a possible implementation, the method further includes: the communications device and the vehicle-mounted control device perform secure authentication on each other to establish a secure cooperation channel. The communications device sends the first partial key to the vehicle-mounted control device includes: the communications device sends the first partial key to the vehicle-mounted control device through the secure channel. In this embodiment of the present disclosure, the secure channel is established between the vehicle-mounted control device and the matched communications device. In this way, subsequently, the first partial key request, a secure authentication request, and the like may be transmitted between the vehicle-mounted control device and the communications device through the secure channel, to further ensure secure transmission between the vehicle-mounted control device and the communications device.

In a possible implementation, the method further includes: after the first to-be-upgraded vehicle-mounted device is successfully upgraded, the communications device receives an indication, sent by the vehicle-mounted control device, indicating to update a rollback file of the first upgrade file; and/or after the first to-be-upgraded vehicle-mounted device fails to be upgraded, the communications device sends a rollback file of the first upgrade file to the vehicle-mounted control device, so that the first to-be-upgraded vehicle-mounted device performs a rollback operation. In this embodiment of the present disclosure, the communications device may provide the rollback file of the upgrade file for the intelligent vehicle. Regardless of whether the to-be-upgraded vehicle-mounted device is successfully upgraded or not, the communications device performs a rollback operation on the current upgrade file, so that the to-be-upgraded vehicle-mounted device may refer to the rollback file during subsequent upgrade.

According to a third aspect, an embodiment of the present disclosure provides an intelligent vehicle, applied to a vehicle upgrade system. The vehicle upgrade system includes an intelligent vehicle and a communications device, and the intelligent vehicle includes a vehicle-mounted control device.

The vehicle-mounted control device is configured to: receive a first partial key sent by the communications device, restore a first key by using the first partial key and a second partial key that is stored on the vehicle-mounted control device; and then perform secure processing on a first upgrade file by using the first key, to obtain the securely processed first upgrade file. The secure processing includes generating first message authentication code (MAC), and the securely processed first upgrade file includes the first upgrade file and the first MAC.

In a possible implementation, the intelligent vehicle further includes a first to-be-upgraded vehicle-mounted device.

The vehicle-mounted control device is further configured to send the securely processed first upgrade file to the first to-be-upgraded vehicle-mounted device.

The first to-be-upgraded vehicle-mounted device is configured to: perform, by using a second key that is stored on the vehicle-mounted control device, secure verification on the securely processed first upgrade file; and if the verification succeeds, perform upgrade based on the first upgrade file that is successfully verified. The second key is a key that pre-matches the first key, and the secure verification is an inverse operation of the secure processing.

In a possible implementation, the secure processing further includes encrypting the first upgrade file and the first MAC by using the first key, and the securely processed first upgrade file includes the first upgrade file and the first MAC that are encrypted by using the first key.

In a possible implementation, the vehicle-mounted control device is further configured to:

before receiving the first partial key sent by the communications device, determine the first key and the second key, and send the second key to the first to-be-upgraded vehicle-mounted device.

In a possible implementation, the vehicle-mounted control device is further configured to:

before receiving the first partial key sent by the communications device, split the first key into the first partial key and the second partial key, and send the first partial key to the communications device.

In a possible implementation, the vehicle-mounted control device is further configured to:

obtain an upgrade package before receiving the first partial key sent by the communications device, perform secure verification on the upgrade package, and when the verification succeeds, request the first partial key from the communications device, where the upgrade package includes the first upgrade file.

In a possible implementation, the communications device includes a terminal device, and the vehicle-mounted control device is further configured to:

before obtaining the upgrade package, send a secure upgrade request to the communications device, where the secure upgrade request includes an upgrade-related parameter of the intelligent vehicle; and when the upgrade-related parameter meets a preset upgrade condition, receive a first indication sent by the communications device, where the first indication is used to trigger the vehicle-mounted control device to obtain the upgrade package from the terminal device or an upgrade server.

In a possible implementation, the vehicle-mounted control device is further configured to perform, with the communications device, secure authentication on each other to establish a secure cooperation channel.

The vehicle-mounted control device is specifically configured to:

receive, through the secure channel, the first partial key sent by the communications device.

In a possible implementation, the vehicle-mounted control device is further configured to:

after the first to-be-upgraded vehicle-mounted device is successfully upgraded, indicate the communications device to update a rollback file of the first upgrade file; and/or after the first to-be-upgraded vehicle-mounted device fails to be upgraded, obtain a rollback file of the first upgrade file from the communications device, and send the rollback file to the first to-be-upgraded vehicle-mounted device for a rollback operation.

According to a fourth aspect, an embodiment of the present disclosure provides a communications device, applied to a vehicle upgrade system. The vehicle upgrade system includes an intelligent vehicle and a communications device. The intelligent vehicle includes a vehicle-mounted control device. The communications device may include:

a first sending unit, configured to send a first partial key to the vehicle-mounted control device, where the vehicle-mounted control device restores a first key by using the first partial key and a second partial key that is stored on the vehicle-mounted control device. The first key is used by the vehicle-mounted control device to perform secure processing on a first upgrade file, to obtain the securely processed first upgrade file. The secure processing includes generating first message authentication code MAC. The securely processed first upgrade file includes the first upgrade file and the first MAC.

In a possible implementation, the vehicle-mounted control device splits the first key into the first partial key and the second partial key. The communications device further includes:

a first receiving unit, configured to: before the first partial key is sent to the vehicle-mounted control device, receive the first partial key sent by the vehicle-mounted control device.

In a possible implementation, the communications device further includes:

a second receiving unit, configured to: before the first partial key is sent to the vehicle-mounted control device, receive a first partial key request sent by the vehicle-mounted control device, where the first partial key request is sent by the vehicle-mounted control device when secure verification performed by the vehicle-mounted control device on an upgrade package succeeds, and the upgrade package includes the first upgrade file.

In a possible implementation, the communications device is a terminal device, and the communications device further includes:

a third receiving unit, configured to: before the first partial key request sent by the vehicle-mounted control device is received, receive a secure upgrade request sent by the vehicle-mounted control device, where the secure upgrade request includes an upgrade-related parameter of the intelligent vehicle;

a determining unit, configured to determine whether the upgrade-related parameter meets a preset upgrade condition; and a second sending unit, configured to: if the upgrade-related parameter meets the preset upgrade condition, send a first indication to the vehicle-mounted control device, where the first indication is used to trigger the vehicle-mounted control device to obtain the upgrade package from the terminal device or an upgrade server.

In a possible implementation, the communications device further includes:

an authentication unit, configured to perform, with the vehicle-mounted control device, secure authentication on each other to establish a secure cooperation channel.

The first sending unit is specifically configured to:

send the first partial key to the vehicle-mounted control device through the secure channel.

In a possible implementation, the communications device further includes:

a fourth receiving unit, configured to: after the first to-be-upgraded vehicle-mounted device is successfully upgraded, receive an indication, sent by the vehicle-mounted control device, indicating to update a rollback file of the first upgrade file; and/or a third sending unit, configured to: after the first to-be-upgraded vehicle-mounted device fails to be upgraded, send a rollback file of the first upgrade file to the vehicle-mounted control device, so that the first to-be-upgraded vehicle-mounted device performs a rollback operation.

According to a fifth aspect, an embodiment of the present disclosure provides a vehicle upgrade system. The vehicle upgrade system includes the communications device according to any one of the implementations of the fourth aspect and the intelligent vehicle according to any one of the implementations of the third aspect.

According to a sixth aspect, this application provides an apparatus for upgrading a vehicle-mounted device. The apparatus for updating a vehicle-mounted device has a function of implementing the method in any one of the foregoing vehicle-mounted device upgrade method embodiments. The function may be implemented by using hardware, or may be implemented by using hardware executing corresponding software. The hardware or software includes one or more modules corresponding to the foregoing function.

According to a seventh aspect, this application provides a vehicle-mounted control device. The vehicle-mounted control device includes a processor, and the processor is configured to support the vehicle-mounted control device in performing a corresponding function in the vehicle-mounted device upgrade method provided in the first aspect. The vehicle-mounted control device may further include a memory. The memory is configured to be coupled to the processor, and stores a program instruction and data that are necessary for the vehicle-mounted control device. The vehicle-mounted control device may further include a communications interface used for communication between the vehicle-mounted control device and another device or a communications network.

According to an eighth aspect, this application provides a to-be-upgraded vehicle-mounted device. The to-be-upgraded vehicle-mounted device includes a processor, and the processor is configured to support a first to-be-upgraded vehicle-mounted device in performing a corresponding function in the vehicle-mounted device upgrade method provided in the first aspect. The to-be-upgraded vehicle-mounted device may further include a memory. The memory is configured to be coupled to the processor, and the memory stores a program instruction and data that are necessary for the to-be-upgraded vehicle-mounted device. The to-be-upgraded vehicle-mounted device may further include a communications interface used for communications between the to-be-upgraded vehicle-mounted device with another device or a communications network.

According to a ninth aspect, this application provides a computer storage medium, configured to store a computer software instruction used by the intelligent vehicle provided in the third aspect. The computer software instruction includes a program designed for performing the foregoing aspect.

According to a tenth aspect, this application provides a computer storage medium, configured to store a computer software instruction used by the communications device provided in the fourth aspect. The computer software instruction includes a program designed for performing the foregoing aspect.

According to an eleventh aspect, an embodiment of the present disclosure provides a computer program, where the computer program includes an instruction. When the computer program is executed by a computer, the computer is enabled to perform a procedure performed by a vehicle-mounted control device or a first to-be-upgraded vehicle-mounted device in the vehicle-mounted device upgrade method according to any one of the implementations of the first aspect.

According to a twelfth aspect, an embodiment of the present disclosure provides a computer program, where the computer program includes an instruction. When the computer program is executed by a computer, the computer is enabled to perform a procedure performed by a communications device in the vehicle-mounted device upgrade method according to any one of the implementations of the second aspect.

According to a thirteenth aspect, this application provides a chip system. The chip system includes at least one processor, configured to support a first to-be-upgraded vehicle-mounted device or a vehicle-mounted control device in implementing a function in the first aspect, for example, receiving or processing data and/or information in the foregoing method. In a possible design, the chip system further includes a memory and an interface circuit. The memory is configured to store a program instruction and data that are necessary for the first to-be-upgraded vehicle-mounted device or the vehicle-mounted control device. The chip system may include a chip, or may include a chip and another discrete component.

DESCRIPTION OF EMBODIMENTS

Figure 1:
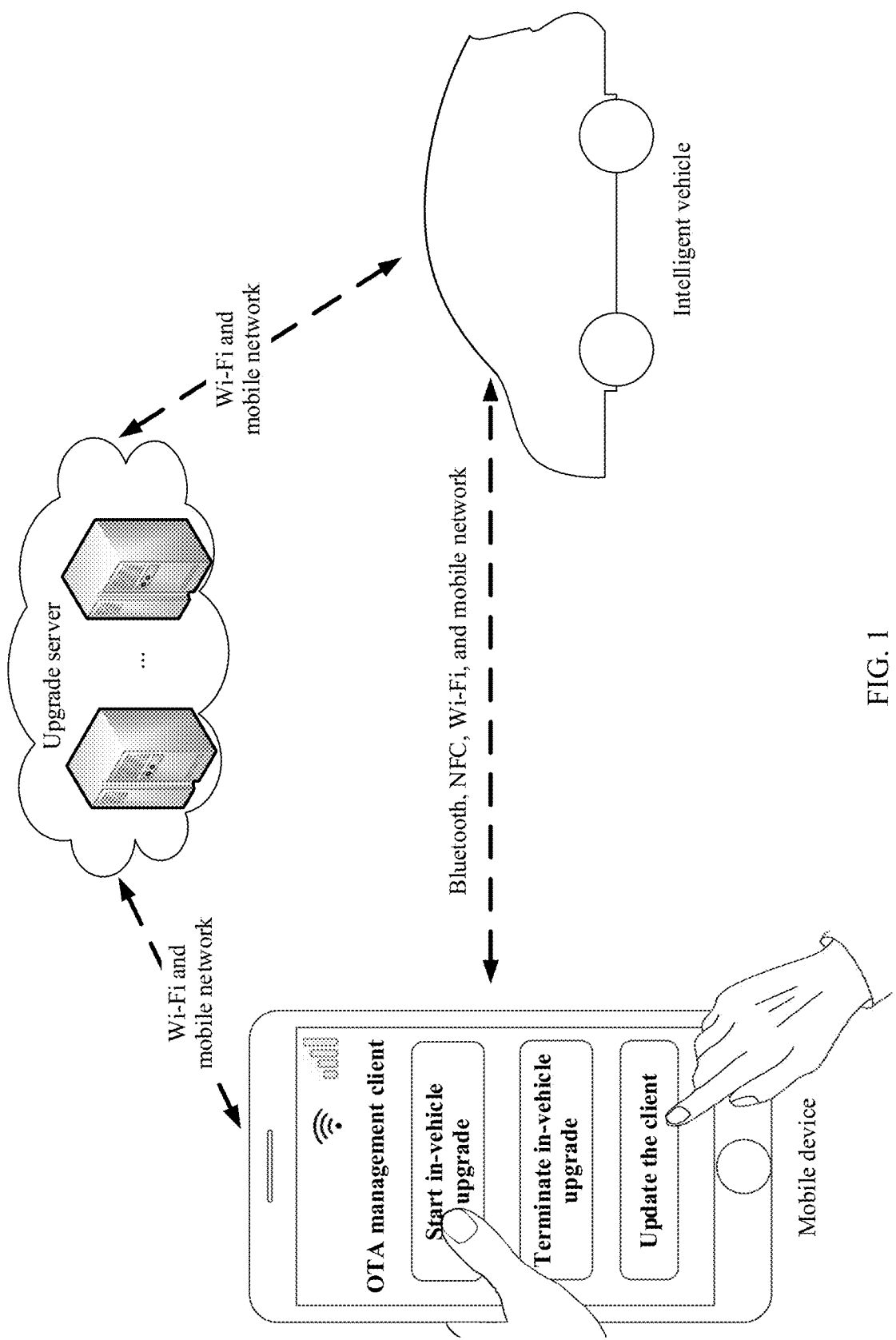
FIG. 1 is a schematic diagram of an application scenario of upgrading a vehicle-mounted device according to an embodiment of the present disclosure.

The following describes the embodiments of the present disclosure with reference to the accompanying drawings in the embodiments of the present disclosure.

In the specification, claims, and accompanying drawings of this application, the terms "first", "second", "third", "fourth" and the like are intended to distinguish between different objects but do not indicate a particular order. In addition, the terms "including", "having", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by persons skilled in the art that the embodiments described in the specification may be combined with another embodiment.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (e.g., data from two components interacting with another component in a local system, a distributed system, and/or across a network such as the Internet interacting with another system by using the signal).

Some terms in this application are first described, to help persons skilled in the art have a better understanding.

(1) An over-the-air (OTA) technology is a technology of remote firmware or software upgrade through an air interface of mobile communication.

(2) Telematics encompasses telecommunications and informatics, and may be literally defined as a service system that provides information through a computer system, a wireless communications technology, a satellite navigation apparatus, or an internet technology for exchanging information such as a text or voice that is built in a transporting vehicle such as an automobile, an aircraft, a vessel, or a train. In brief, the service system connects a vehicle to the internet through a wireless network, and provides a vehicle user with various information necessary for life or driving.

(3) An electronic control unit (ECU) is a vehicle-specific microcontroller from a perspective of usage. Like a common computer, the electronic control unit includes large-scale integrated circuits such as a microprocessor (CPU), a memory (ROM or RAM), an input/output interface (I/O), an analog-to-digital converter (A/D), a shaper, and a drive.

(4) A vehicle control unit (VCU) may also be referred to as an integrated electric vehicle controller.

The VCU is a general controller of an electric vehicle power system, is responsible for coordinating operation of various parts such as an engine, a drive motor, a gearbox, or a power battery, and has a function of improving power performance, safety performance, and economical efficiency of a vehicle. The VCU is a critical component of the integrated electric vehicle control system and is a critical control component configured to control start, operation, advance and retreat, speed, and stop of a motor of an electric vehicle and control another electronic device of the electric vehicle. As a most critical component of a control system of a pure electric vehicle, the VCU is responsible for data exchange, safety management, driver intension interpretation, and power stream management. The VCU collects a motor control system signal, an accelerator pedal signal, a brake pedal signal, and a signal of another component, comprehensively analyzes a driving intension of a driver and perform determining as a response, and monitors actions of controllers of lower-layer components. The VCU plays a critical role in functions such as normal driving of a vehicle, battery power braking and regeneration, network management, fault diagnosis and processing, and vehicle status monitoring.

(5) A controller area network (CAN) bus is one of the most widely applied field buses in the world. High reliability and a sound error detection capability of the CAN bus receive much attention, and therefore the CAN bus is widely applied to a vehicle computer control system and an industry environment with a hash ambient temperature, strong electromagnetic radiation, and intense vibration. The CAN bus is a widely applied field bus and has a great application prospect in industry detection and control, industrial automation, and other fields. A CAN is a communications network with serial buses. The CAN bus has advantages of being reliable, real-time, and flexible in data communication. For transparent design and flexible execution, a structure of the CAN bus is divided into a physical layer and a data link layer (including a logical link control LLC sublayer and a media access control MAC sublayer) according to an ISO/OSI standard model.

(6) Message authentication code (MAC) is an authentication mechanism used by both communication entities, and is a tool for ensuring data integrity of a message. The MAC is similar to a digest algorithm, but a key is further used for computation. Therefore, MAC is a value obtained based on a key and a message digest. Actually, the MAC generates redundant information for a message, and the redundant information can be used for data source authentication and integrity verification.

(7) Key derivation algorithm is a key derivation function (KDF) used during encryption and decryption. A function of the key derivation function is generating key data from a shared secret bit serial port. During key negotiation, the key derivation function is used on a shared secret bit string obtained during key exchange, to generate a required session key or key data required for further encryption.

(8) Public key password: A public key password is also referred to as an asymmetrical password. An asymmetrical key algorithm means that an encryption key and a decryption key of an encryption algorithm are different, or one key cannot be derived from the other key. A user who has a public key password has an encryption key and a decryption key. The decryption key cannot be obtained by using the encryption key. In addition, the encryption key is public. The public key password is designed based on this principle, to use assistance information (trapdoor information) as a privacy key. Security of the password depends on computation complexity of a problem on which the password is based. Currently, a common public key password includes an RSA public key password, an ElGamal public key password, and an elliptic curve password.

(9) Symmetric password: Symmetric key encryption is also referred to as dedicated key encryption. To be specific, a data sender and a data receiver necessarily use a same key to perform encryption and decryption operation on a plaintext. In other words, an encryption key can be deduced from a decryption key, and vice versa. In most symmetric algorithms, an encryption key is the same as a decryption key. These algorithms are also referred to as privacy key algorithms or single key algorithms, and require a sender and a receiver to agree on a key before secure communication. Security of a symmetric algorithm depends on a key. If the key is leaked, anyone can encrypt or decrypt a message. The key needs to keep confidential provided that communication requires confidentiality.

It can be learned from the foregoing description of the symmetric key algorithm and the asymmetric key algorithm that, during encryption and decryption of the symmetric key, a same key is used or a decryption key can be easily deduced from an encryption key. The symmetric key algorithm features simple encryption processing, fast encryption and decryption, a short length of a key, and a long development history. The asymmetric key algorithm features slow encryption and decryption, a long length of a key, and a short development history.

(10) The transport layer security (TLS) protocol is used to provide confidentiality and data integrity between two application programs. The protocol includes two layers: the TLS record protocol and the TLS handshake protocol. The transport layer security protocol is used to ensure confidentiality and data integrity between two communications application programs.

(11) A terminal device may be user equipment (UE), a station (ST) in a wireless local area network (WLAN), a cellular phone, a wireless local loop (WLL) station, a personal digital assistant (PDA) device, a handheld device or a computing device having a wireless communication function, another processing device or a wearable device connected to a wireless modem, or the like.

To facilitate understanding of the embodiments of the present disclosure, the following lists, as an example, scenarios to which a vehicle-mounted device upgrade method in this application is applied. The following three scenarios may be included.

Scenario 1: One-to-one management is performed on an intelligent vehicle through a communications device.

FIG. 1 is a schematic diagram of an application scenario of upgrading a vehicle-mounted device according to an embodiment of the present disclosure. The application scenario includes a communications device (e.g., the communications device is a terminal device such as a smartphone in FIG. 1), an intelligent vehicle, and an upgrade server or a key server. The terminal device may communicate with the intelligent vehicle through Bluetooth, NFC, Wi-Fi, a mobile network, and the like. The upgrade server may communicate with the terminal device or the intelligent vehicle through Wi-Fi, a mobile network, and the like. A one-to-one matching relationship may be established between the smartphone and the intelligent vehicle. For example, matching is performed between a license plate or a unique identifier of the intelligent vehicle and an identity card or a valid account of the terminal device. After the matching is completed, the smartphone and the intelligent vehicle may jointly perform a procedure of the vehicle-mounted device upgrade method provided in this application. In this way, a user can perform upgrade management on a driving vehicle through the smartphone, to ensure upgrade security of the vehicle.

Scenario 2: One-to-many management is performed on intelligent vehicles through a communications device.

Figure 2:
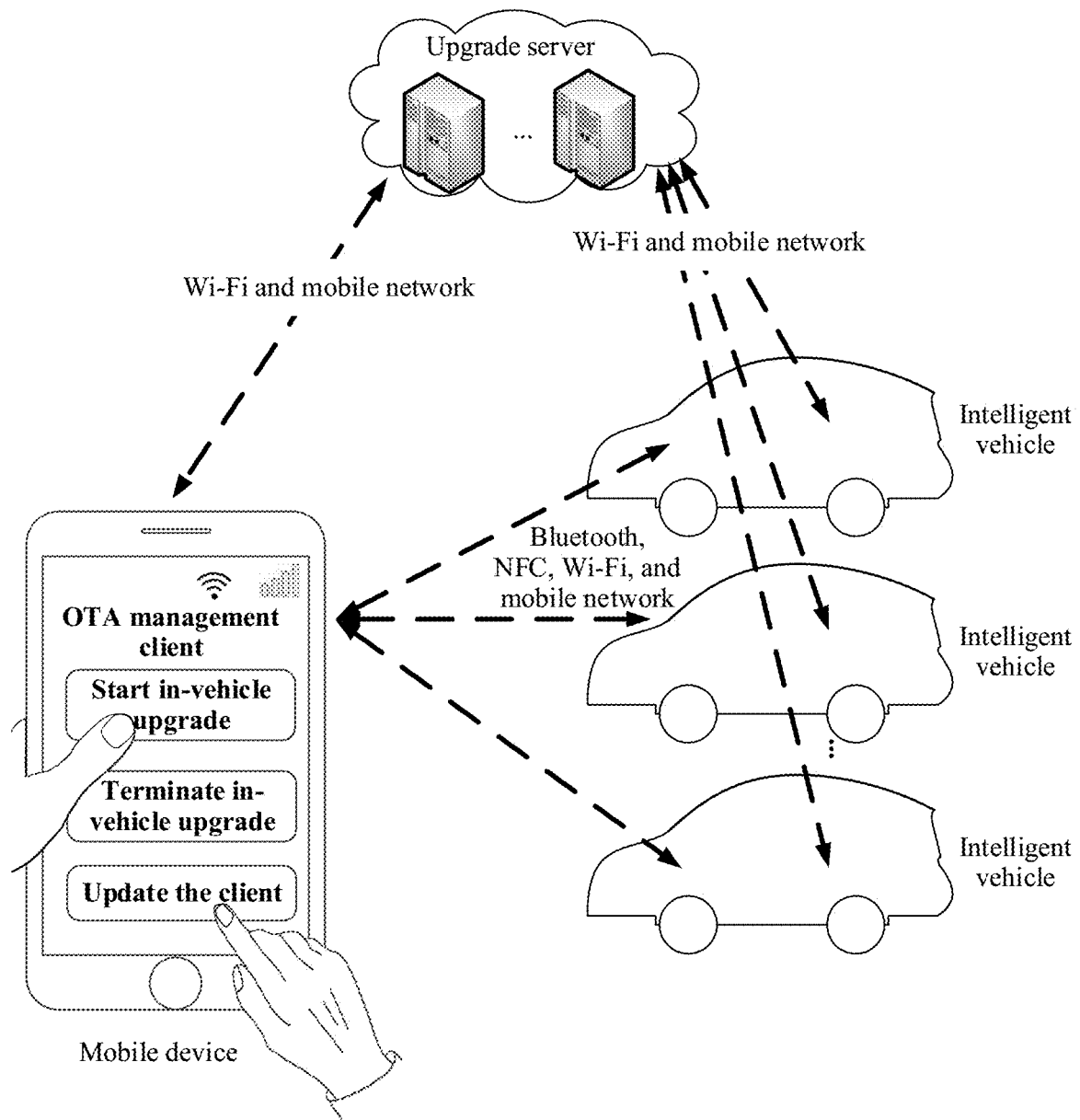
FIG. 2 is a schematic diagram of another application scenario of upgrading a vehicle-mounted device according to an embodiment of the present disclosure.

FIG. 2 is a schematic diagram of another application scenario of upgrading a vehicle-mounted device according to an embodiment of the present disclosure. The application scenario includes a communications device (e.g., the communications device is a terminal device such as a smartphone in FIG. 2), a plurality of intelligent vehicles, and an upgrade server or a key server. For a communication manner in the application scenario, refer to the communication manner in FIG. 1. Details are not described herein again. A one-to-many matching relationship may be established between the smartphone and the intelligent vehicles. For example, one user may own and manage a plurality of vehicles at the same time, or one user may manage vehicles of a plurality of different users. For example, an employee in a 4S shop uses a dedicated terminal device to upgrade systems of all vehicles of a same model in the shop, or a user uses a terminal device of the user to provide or manage an upgrade package for a nearby intelligent vehicle that has a matching relationship with the terminal device of the user. In this way, one device can manage a plurality of intelligent vehicles at the same time, thereby saving time, network transmission bandwidth, and storage resources, and ensuring upgrade security of the vehicles. It may be understood that, in one-to-many management, the terminal device needs to pre-store related information of the plurality of vehicles, or the plurality of vehicles prove, to the terminal device, validity of the plurality of vehicles and a service relationship between the plurality of vehicles and the terminal device.

Scenario 3: One-to-many management is performed through a server, where the server is a communications device.

Figure 3:
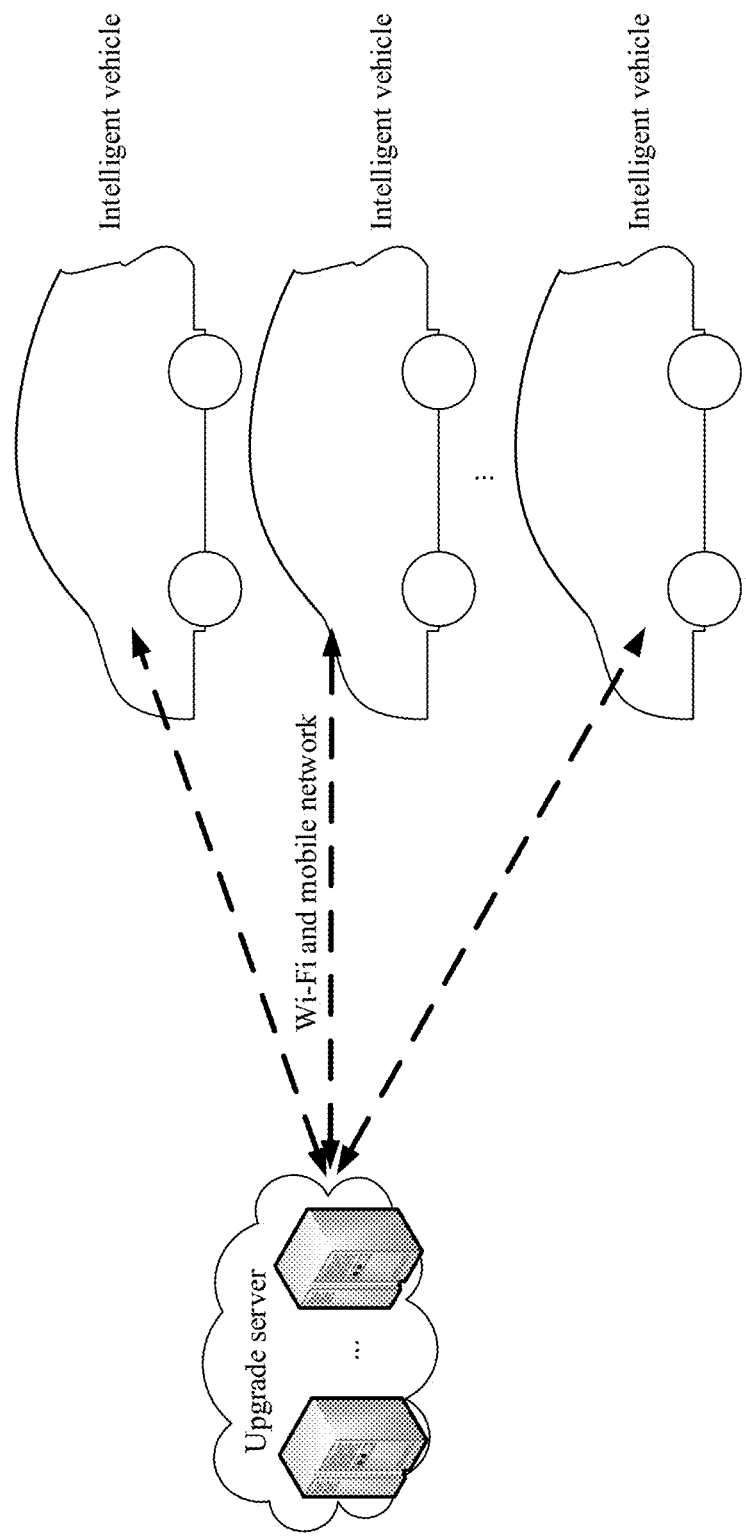
FIG. 3 is a schematic diagram of still another application scenario of upgrading a vehicle-mounted device according to an embodiment of the present disclosure.

FIG. 3 is a schematic diagram of still another application scenario of upgrading a vehicle-mounted device according to an embodiment of the present disclosure. The application scenario includes an intelligent vehicle and a server (optionally, the server may be a key server or a dedicated server, and these two servers and an upgrade server may be on a same physical entity). The upgrade server may communicate with the intelligent vehicle through Wi-Fi, a mobile network, or the like. The upgrade server may perform upgrade management on a plurality of valid and registered intelligent vehicles. In addition, the upgrade server can complete a related service, for example, providing an upgrade package or downloading and updating an upgrade package, and may further serve as a communications device in this application to collaborate with the intelligent vehicle to perform a procedure of the vehicle-mounted device upgrade method provided in this application. For example, a logical functional entity is newly added to the upgrade server, and the logical functional entity is configured to store a related key, to perform security enhancement on intra-vehicle storage or transmission of an upgrade file, thereby ensuring secure upgrade of the vehicle. Optionally, when the communications device is a key server, an operation of determining whether a related upgrade condition is met for the intelligent vehicle, indicating the intelligent vehicle to download an upgrade package, and providing a related rollback file in this application may be performed by the upgrade server.

It may be understood that the application scenarios in FIG. 1, FIG. 2, and FIG. 3 are merely several example implementations in this embodiment of the present disclosure, and the application scenarios in this embodiment of the present disclosure include but are not limited to the foregoing application scenarios.

Figure 4:
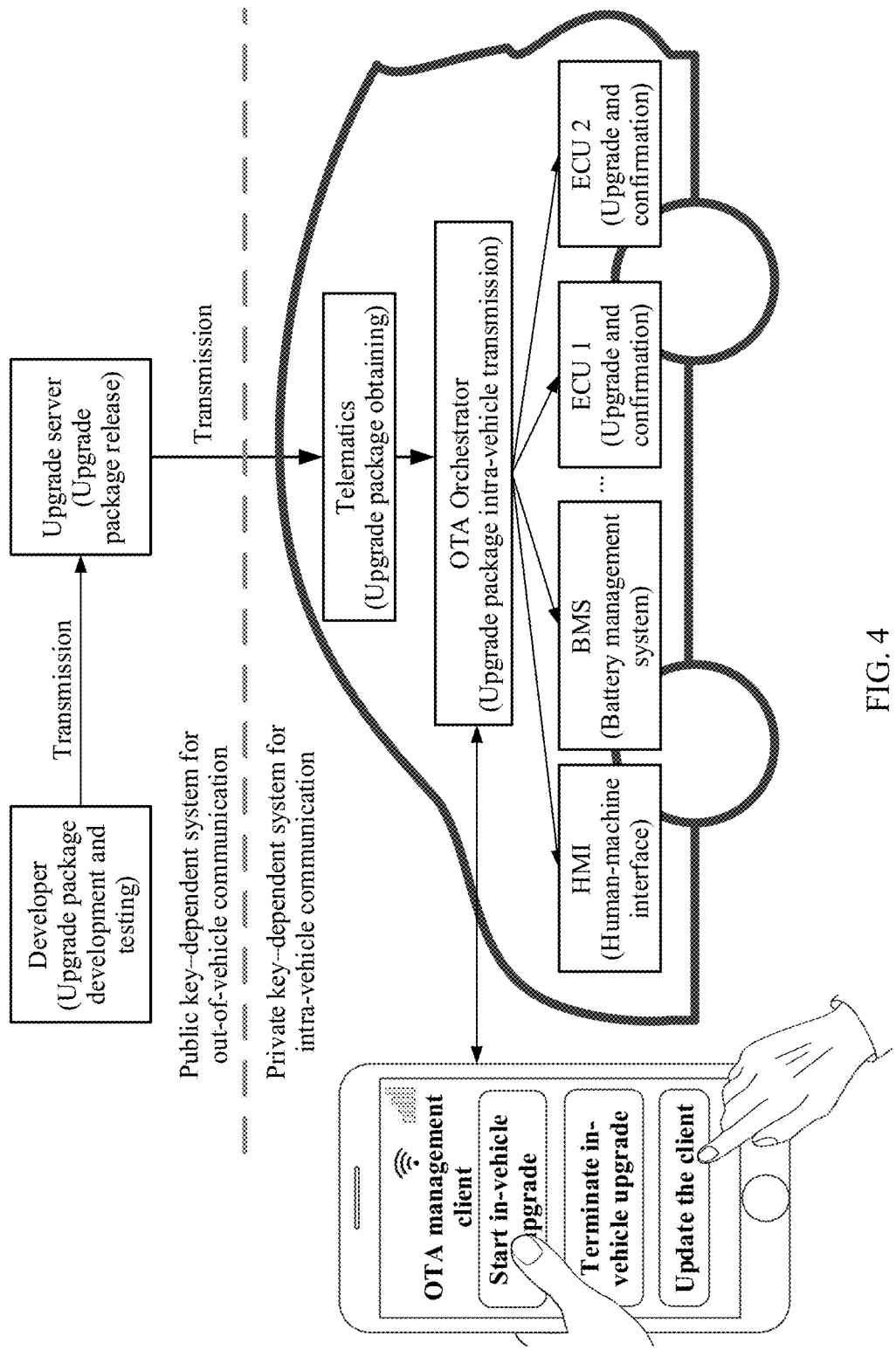
FIG. 4 is a schematic diagram of an in-vehicle system upgrade architecture according to an embodiment of the present disclosure.

With reference to the foregoing application scenarios, the following first describes one system architecture on which the embodiments of the present disclosure are based. FIG. 4 is a schematic diagram of a vehicle-mounted system upgrade architecture (architecture 1, for short) according to an embodiment of the present disclosure. A vehicle-mounted device upgrade method provided in this application may be applied to the system architecture. The system architecture includes an upgrade server, intelligent vehicles, and a communications device (e.g., the communications device is a terminal device such as a smartphone in FIG. 4). The intelligent vehicles include a vehicle-mounted control device and one or more to-be-upgraded vehicle-mounted devices, such as an HMI (human-machine interface), a BMS (battery management system), an ECU 1, and an ECU 2. The vehicle-mounted control device may include a telematics unit and an OTA orchestrator unit, and is configured to manage and assist in a process of upgrading the plurality of to-be-upgraded vehicle-mounted devices. In the foregoing system architecture, vehicle-mounted device remote upgrade may include the following basic processes: upgrade package release, upgrade package obtaining, upgrade package intra-vehicle transmission, and upgrade and confirmation.

The upgrade server may be configured to obtain an unencrypted in-vehicle upgrade package from a developer. The in-vehicle upgrade package includes a first upgrade file in this application, and may be used to upgrade a first to-be-upgraded vehicle-mounted device.

The telematics in the vehicle-mounted control device is responsible for external communication, and in this application, is responsible for communicating with the upgrade server and a key server, to obtain the in-vehicle upgrade package, and complete some transmission actions (e.g., send the in-vehicle upgrade package to the OTA orchestrator) of the in-vehicle upgrade package.

The OTA orchestrator in the vehicle-mounted control device is responsible for communicating with a to-be-upgraded vehicle-mounted device in a vehicle or the communications device (e.g., the communications device is a terminal device in FIG. 4) in this application. A main function of the OTA orchestrator is to manage and assist in a process of upgrading the vehicle-mounted device. Specifically, the OTA orchestrator may have the following functions: distributing and managing a key (including determining a first key and a second key, and splitting and restoring the first key); managing an OTA process, collaborating with the communications device to help other to-be-upgraded vehicle-mounted devices weak in computation capabilities by sharing operations with a large computation amount, for example, verifying integrity and authenticity of an upgrade package, and performing transcoding; serving, with the communications device, as backup nodes for other to-be-upgraded vehicle-mounted devices weak in computation capabilities to roll back when upgrade fails. The OTA orchestrator is a logical entity that can be physically deployed on any powerful unit or module, for example, Telematics, a gateway, and a VCU.

Figure 5:
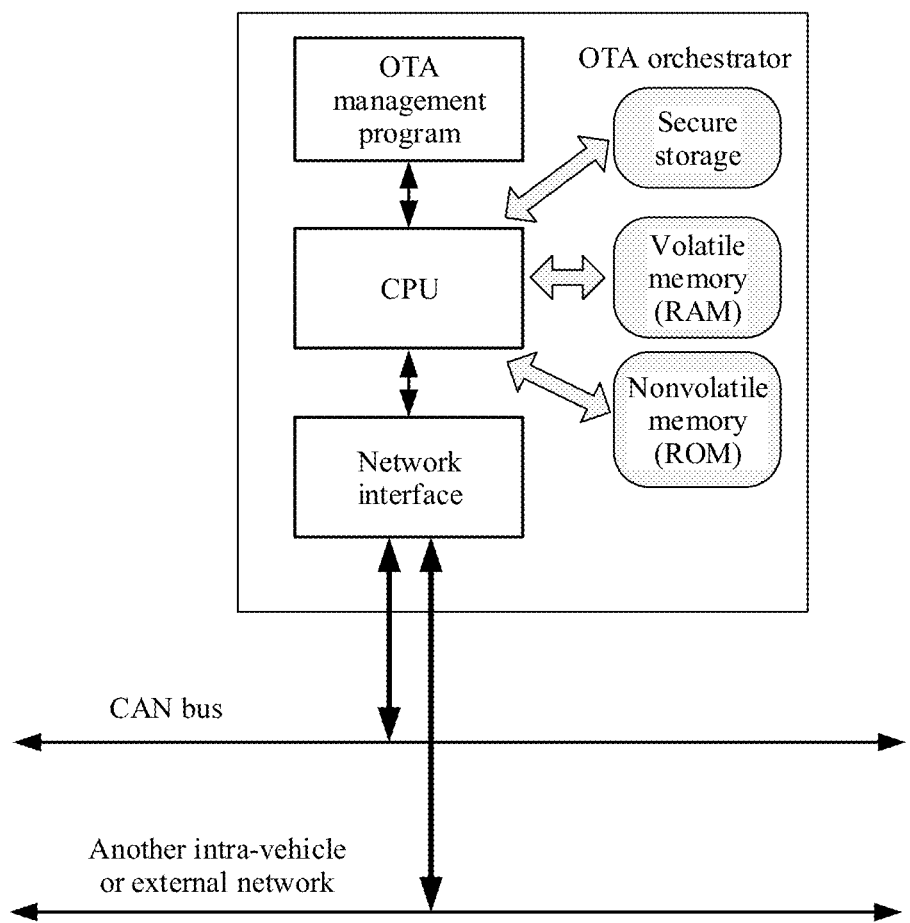
FIG. 5 is a schematic structural diagram of an OTA orchestrator according to an embodiment of the present disclosure.

A structure of the OTA orchestrator may be shown in FIG. 5. FIG. 5 is a schematic structural diagram of an OTA orchestrator according to an embodiment of the present disclosure. The OTA orchestrator may include: a processor (e.g., a CPU) and a related volatile memory RAM and a nonvolatile memory ROM; secure storage for storing a key, for example, a static key (a first key and a second key in this application) shared with a to-be-upgraded vehicle-mounted device; a memory configured to store an OTA management program, where the OTA management program is configured to manage an upgrade process; and a network interface used for communication with another vehicle-mounted device through a CAN bus or another intra-vehicle network. It can be understood that, if the OTA orchestrator is implemented on the telematics, the OTA orchestrator further requires a network interface to communicate with an external network. To be specific, the OTA orchestrator needs to have a relatively strong computation capability and a relatively large quantity of resources, to assist a vehicle-mounted device in completing remote upgrade and to be trusted by another vehicle-mounted device. In terms of logical architecture division, the OTA orchestrator divides the architecture into an out-of-vehicle communication part and an intra-vehicle communication part. Devices in a vehicle only need to perform an operation related to a symmetric password rather than an operation related to a public key password. If there is an operation related to a public key password, the OTA orchestrator performs the operation, to reduce a computation amount and computation complexity for the to-be-upgraded device in the vehicle.

Figure 6:
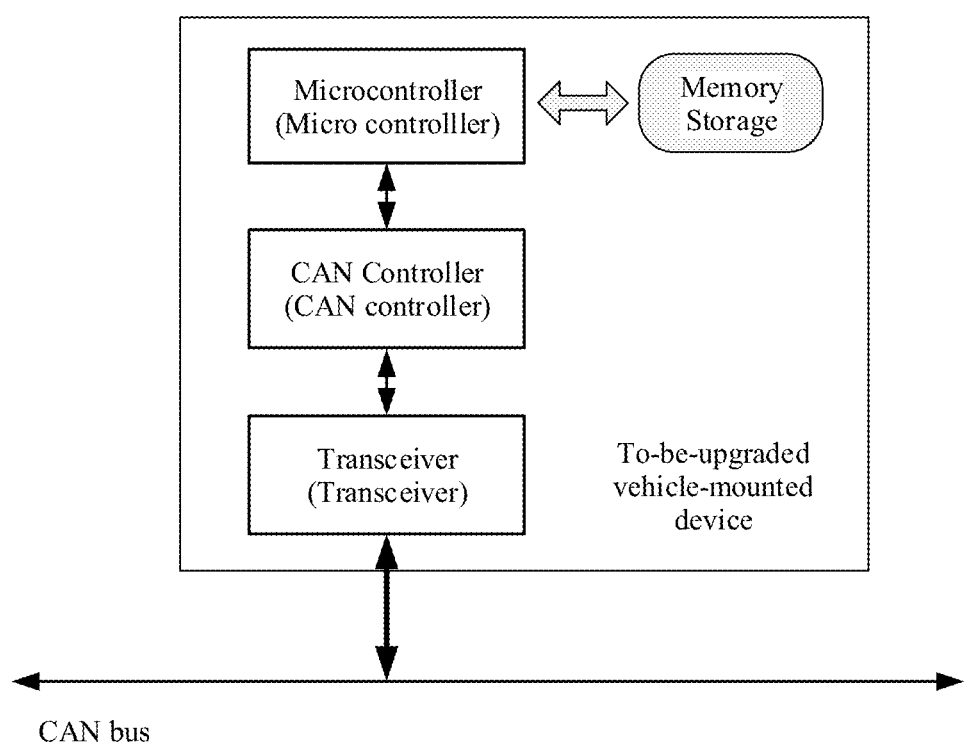
FIG. 6 is a schematic structural diagram of a to-be-upgraded vehicle-mounted device according to an embodiment of the present disclosure.

For a to-be-upgraded vehicle-mounted device, composition of any to-be-upgraded vehicle-mounted device (including the first to-be-upgraded vehicle-mounted device in this application) may be shown in FIG. 6. FIG. 6 is a schematic structural diagram of a to-be-upgraded vehicle-mounted device according to an embodiment of the present disclosure. The to-be-upgraded vehicle-mounted device may include a microcontroller, a CAN controller, and a transceiver. The to-be-upgraded vehicle-mounted device communicates with an intra-vehicle network such as a CAN bus via the transceiver. The CAN controller is configured to implement a CAN protocol. The microcontroller is configured to implement related computation processing before and after upgrade, for example, may implement a vehicle-mounted device upgrade method performed by the to-be-upgraded vehicle-mounted device in this application. With reference to the foregoing schematic structural diagram, in this application, the to-be-upgraded vehicle-mounted device receives, through an intra-vehicle network such as the CAN bus and via the transceiver, a first upgrade file sent by a vehicle-mounted control device, and performs secure upgrade by using the first upgrade file via the micro controller. For more specific functions, refer to descriptions of related functions of the to-be-upgraded vehicle-mounted device in subsequent embodiments.

A communications device in this application may be a terminal device or an upgrade server, and is configured to participate in a secure upgrade process of an intelligent vehicle with respect to resource expansion, security enhancement, upgrade control, and the like. For example, the communications device assists, with a storage capability, in storing an intermediate file (e.g., software/firmware information, a current version, a size, a developer, and the like of each to-be-upgraded vehicle-mounted device), a backup file (e.g., a software/fixed rollback version for a to-be-upgraded vehicle-mounted device), and a system status of a vehicle, to complete storage extension.

The communications device uses a computing capability to perform transcoding, to implement computing extension. The communications device uses a networking capability to download an upgrade package, share transmission overheads, and implement transmission extension. Each time when there is an upgrade task, the communications device verifies whether an OTA orchestrator is complete or whether an entire vehicle is in a secure state, which is referred to as an attestation. The communications device ensures security of a key by using a method of separate management of a key (secret sharing) in which the vehicle-mounted OTA orchestrator and the communications device store partial keys. The communications device performs secure detection (e.g., malware detection malware detection) through an existing security module, to implement security enhancement. The communications device (e.g., a terminal device) serves as a remote control console for software/firmware upgrade (a user can choose whether to upgrade or not, and can choose an upgrade time, and a single or group upgrade mode if upgrade is to be performed), to implement remote control and upgrade for the user.

Figure 7:
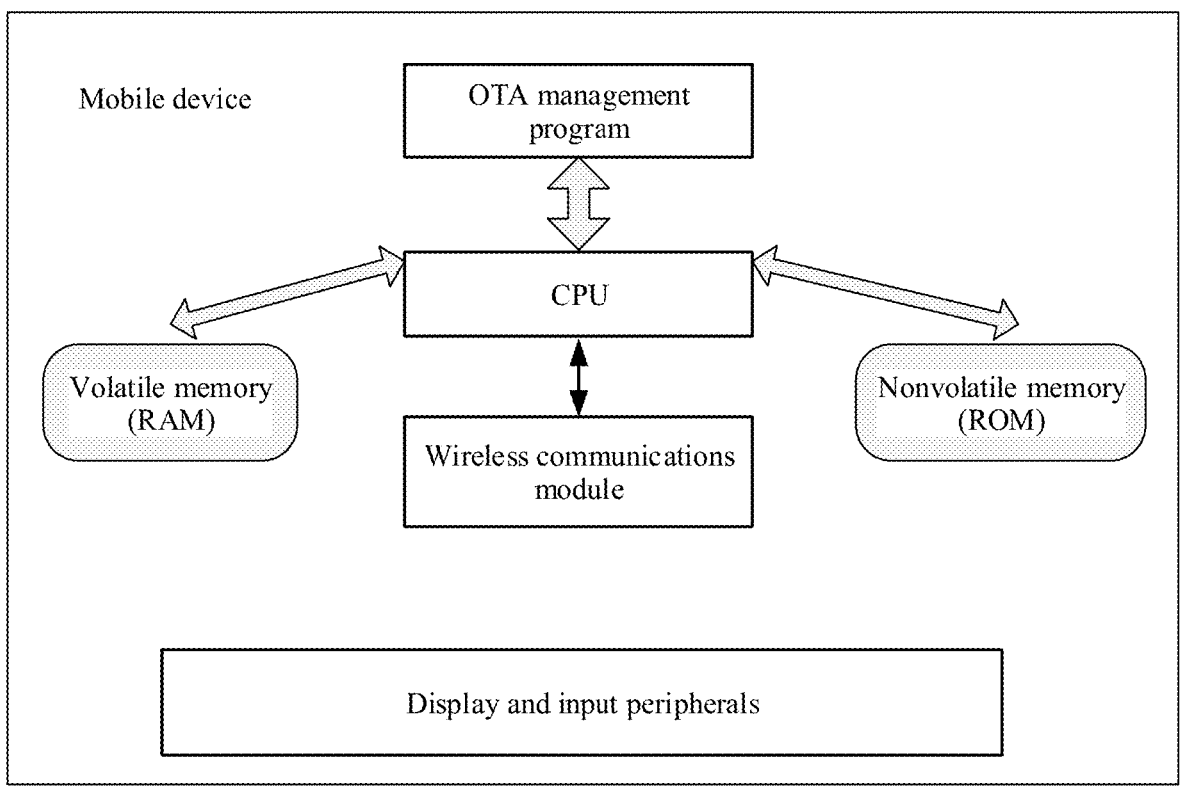
FIG. 7 is a schematic structural diagram of a terminal device according to an embodiment of the present disclosure.

When the communications device is a terminal device, for composition of the terminal device, refer to FIG. 7. FIG. 7 is a schematic structural diagram of a terminal device according to an embodiment of the present disclosure. The terminal device may include: a processor (e.g., a CPU) and a related volatile memory RAM and a nonvolatile memory ROM; a memory configured to store an OTA management program, where the OTA management program is configured to manage an upgrade process; a wireless communications module configured to communicate with another device (including an intelligent vehicle, an upgrade server, and the like); display and input peripherals, for example, an audio input and output module, a key or touch input module, and a display, configured to provide an in-vehicle upgrade interaction control interface for a user. It should be noted that, when the communications device is a server and the server and the upgrade server in this application are located on a same physical entity, the upgrade server may include a logical functional entity for implementing functions implemented by the communications device. Therefore, a specific actual structure of the communications device is not specifically limited in this application. In addition, when the communications device is a terminal device, a corresponding application scenario is as shown in FIG. 1 and FIG. 2. When the communications device is a server, a corresponding application scenario is as shown in FIG. 3.

It may be understood that the architecture of the communications system in FIG. 1 is merely an example implementation in the embodiments of the present disclosure, and an architecture of a communications system in the embodiments of the present disclosure includes but is not limited to the foregoing architecture of the communications system.

Figure 8:
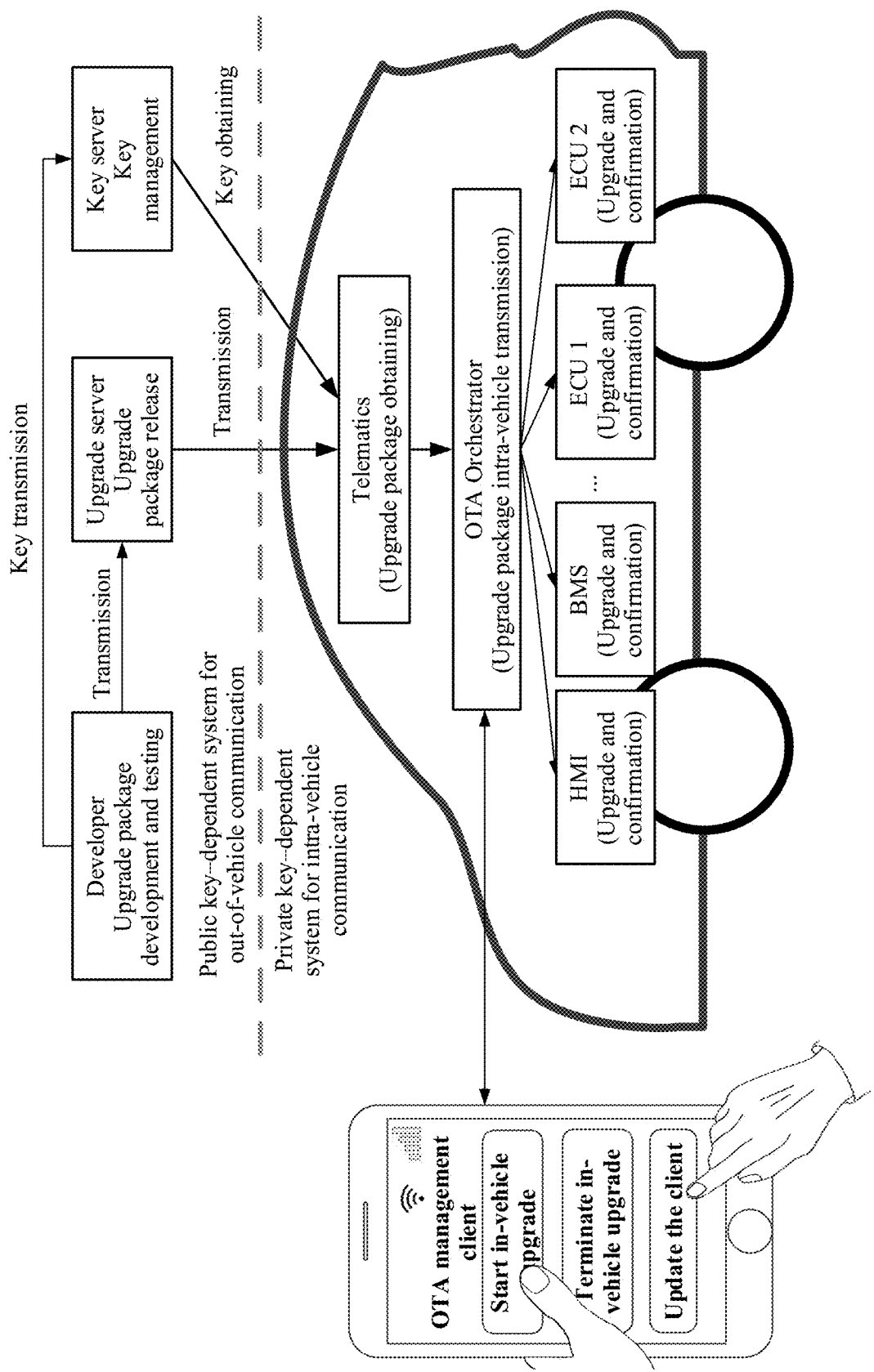
FIG. 8 is a diagram of another in-vehicle system upgrade architecture according to an embodiment of the present disclosure.

FIG. 8 is a diagram of another in-vehicle system upgrade architecture (architecture 2, for short) according to an embodiment of the present disclosure. The vehicle-mounted system upgrade architecture provided in FIG. 8 is different from the system upgrade architecture provided in FIG. 1 in that a key server is further included.

An upgrade server is configured to obtain, from a developer, an in-vehicle upgrade package encrypted by the developer.

A key server is configured to: when the in-vehicle upgrade package is encrypted by the developer, obtain a key from the developer through a secure channel, store the key, and finally provide the key to a vehicle-mounted control device. It can be understood that when a communications device in this application is a server, for example, a dedicated server, the dedicated server may be the key server. In other words, the key server stores a key related to the upgrade package, and further stores a related key, for example, a first partial key, in an intra-vehicle transmission process.

It can be understood that, for other specific functions of the vehicle-mounted control device and a plurality of to-be-upgraded vehicle-mounted devices, refer to descriptions of the function entities or units in the in-vehicle system upgrade architecture corresponding to FIG. 4. Details are not described herein again.

It can be further understood that, the in-vehicle system upgrade architecture in this application may further include the developer. After developing and testing an upgrade program of firmware/software, the developer delivers the in-vehicle upgrade package to the upgrade server, where the delivered in-vehicle upgrade package needs to be signed through digital signature. Optionally, before being signed through digital signature, the in-vehicle upgrade package may be further encrypted. If the in-vehicle upgrade package is not encrypted, a corresponding system architecture is as shown in FIG. 4. If the in-vehicle upgrade package is encrypted, a corresponding system architecture is as shown in FIG. 8. Corresponding embodiments are to be detailed in the following descriptions.

It should be noted that, the in-vehicle system upgrade architectures in FIG. 4 and FIG. 8 are merely two examples of implementations of the embodiments of the present disclosure. An architecture of a communications system in the embodiments of the present disclosure includes but is not limited to the foregoing system architecture.

With reference to the foregoing application scenario, the system architecture, and the embodiment of the vehicle-mounted device upgrade method provided in this application, the following specifically analyzes and resolves the technical problem proposed in this application.

Figure 9:
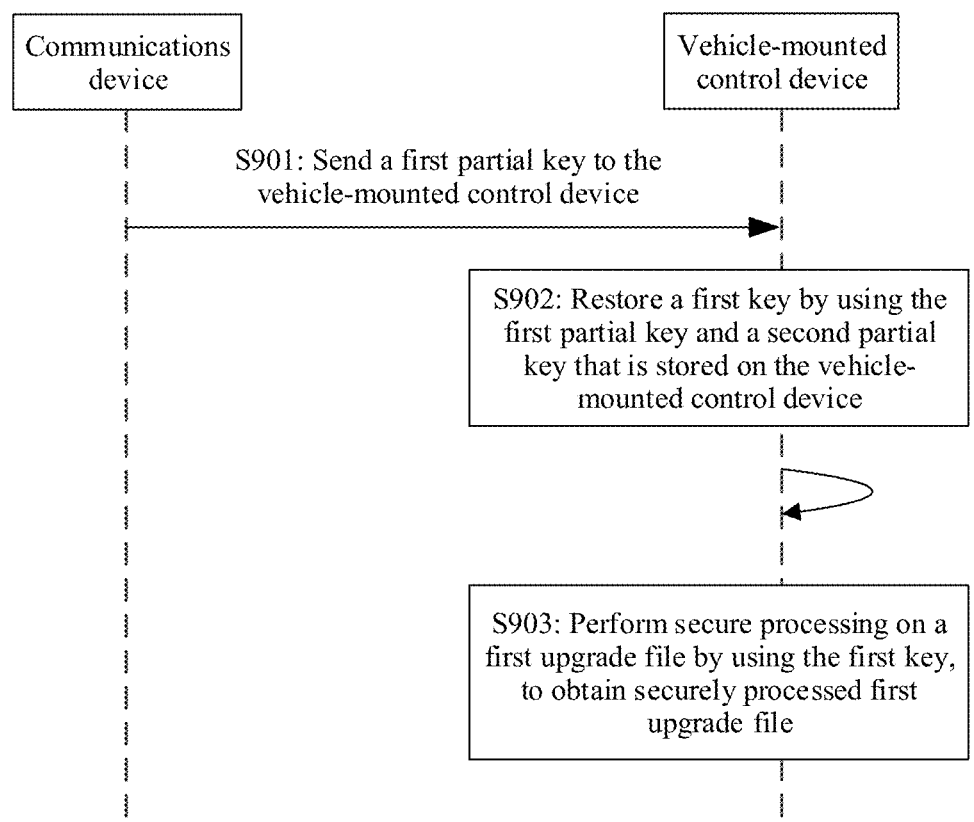
FIG. 9 is a schematic flowchart of a vehicle-mounted device upgrade method according to an embodiment of the present disclosure.

FIG. 9 is a schematic flowchart of a vehicle-mounted device upgrade method according to an embodiment of the present disclosure. The vehicle-mounted device upgrade method is applied to an in-vehicle system (including the foregoing architecture 1 and architecture 2), and is applicable to any one of the foregoing application scenarios in FIG. 1 to FIG. 3. The system includes an intelligent vehicle and a communications device, and the intelligent vehicle includes a vehicle-mounted control device. The following provides description from a perspective of interaction between the intelligent vehicle and the communications device with reference to FIG. 9. The method may include the following step S901 to step S903.

Step S901: The communications device sends a first partial key to the vehicle-mounted control device. The vehicle-mounted control device receives the first partial key sent by the communications device.

Specifically, the first partial key is obtained by the vehicle-mounted control device from the communications device (e.g., a terminal device or an upgrade server). In other words, the vehicle-mounted control device does not have the first partial key currently. When the first partial key comes from a terminal device (e.g., a smartphone), the intelligent vehicle and the terminal device perform separate storage and management of a key, and implement secure intra-vehicle storage or transmission. When the first partial key comes from a key server or a dedicated server, the intelligent vehicle and the server perform separate storage and management of a key, and implement secure intra-vehicle storage or transmission. This avoids a case that the key is easily intercepted and tampered with by an unauthorized user due to only storage on only one device, and therefore ensures security of upgrade file storage or transmission in the intelligent vehicle. It should be noted that when the communications device is a terminal device, the terminal device needs to establish a matching relationship with the intelligent vehicle. If the communications device is an upgrade server, the upgrade server provides an upgrade package (including the first upgrade file) for the intelligent vehicle.

Step S901: The vehicle-mounted control device restores a first key by using the first partial key and a second partial key that is stored on the vehicle-mounted control device.

Specifically, the vehicle-mounted control device obtains the first partial key from the communications device, and restores the first key by using the first partial key and the second partial key that has been stored on the vehicle-mounted control device. The second partial key stored on the vehicle-mounted control device may be initially stored on the vehicle-mounted control device, or may be obtained from another device (e.g., the upgrade server or the key server) and stored on the vehicle-mounted control device. This is not specifically limited in this embodiment of the present disclosure.

Step S903: The vehicle-mounted control device performs secure processing on the first upgrade file by using the first key, to obtain the securely processed first upgrade file.

Specifically, after obtaining the restored first key, the vehicle-mounted control device performs secure processing on the first upgrade file by using the first key. The secure processing includes generating first message authentication code (MAC), and the securely processed first upgrade file includes the first upgrade file and the first MAC. Optionally, the first key is a symmetric key. The vehicle-mounted control device generates the first message authentication code MAC of the first upgrade file by using the first key, and the securely processed first upgrade file is (the first upgrade file+the first MAC). To be specific, when the upgrade file is transmitted between the vehicle-mounted control device and a to-be-upgraded vehicle-mounted device in the intelligent vehicle, the MAC of the upgrade file is specifically generated by using the symmetric key, and is carried in the first upgrade file and sent to the to-be-upgraded vehicle-mounted device. This ensures security of the upgrade file during intra-vehicle transmission, reduces a computation amount of intra-vehicle secure verification (because a computation amount of the symmetric key is small), and therefore improves upgrade efficiency. Optionally, the secure processing may also be signature processing, encryption processing, or other secure processing. This is not specifically limited in this embodiment of the present disclosure.

In a possible implementation, the secure processing further includes encrypting the first upgrade file and the first MAC by using the first key, and the securely processed first upgrade file includes the first upgrade file and the first MAC that are encrypted by using the first key. To be specific, during transmission of the upgrade file between the vehicle-mounted control device and the to-be-upgraded vehicle-mounted device in the intelligent vehicle, the MAC of the upgrade file is generated and carried in the first upgrade file, and the MAC and the first upgrade file are encrypted by using the first key. Then, the encrypted first upgrade file and the encrypted MAC are sent to the to-be-upgraded vehicle-mounted device. This ensures integrity of the upgrade file during intra-vehicle transmission, reduces a computation amount of intra-vehicle secure verification, and therefore improves upgrade efficiency. In addition, privacy of the upgrade file is further ensured, to avoid theft by an unauthorized user.

In this embodiment of the present disclosure, the communications device that matches the intelligent vehicle is added to an in-vehicle upgrade architecture, and is used as a carrier for separate storage of a secure key of the intelligent vehicle. When the vehicle-mounted control device in the intelligent vehicle performs secure processing on the upgrade file, the vehicle-mounted control device may obtain the partial key stored on the communications device to restore the key, and perform secure processing on the upgrade file by using the restored key. In this way, secure intra-vehicle storage and/or transmission of the upgrade file is ensured, and a case that the key is easily intercepted and tampered with by an unauthorized user due to only storage on the intelligent vehicle or the communications device is avoided. This ensures security of upgrade file storage or transmission in the intelligent vehicle.

Figure 10A:
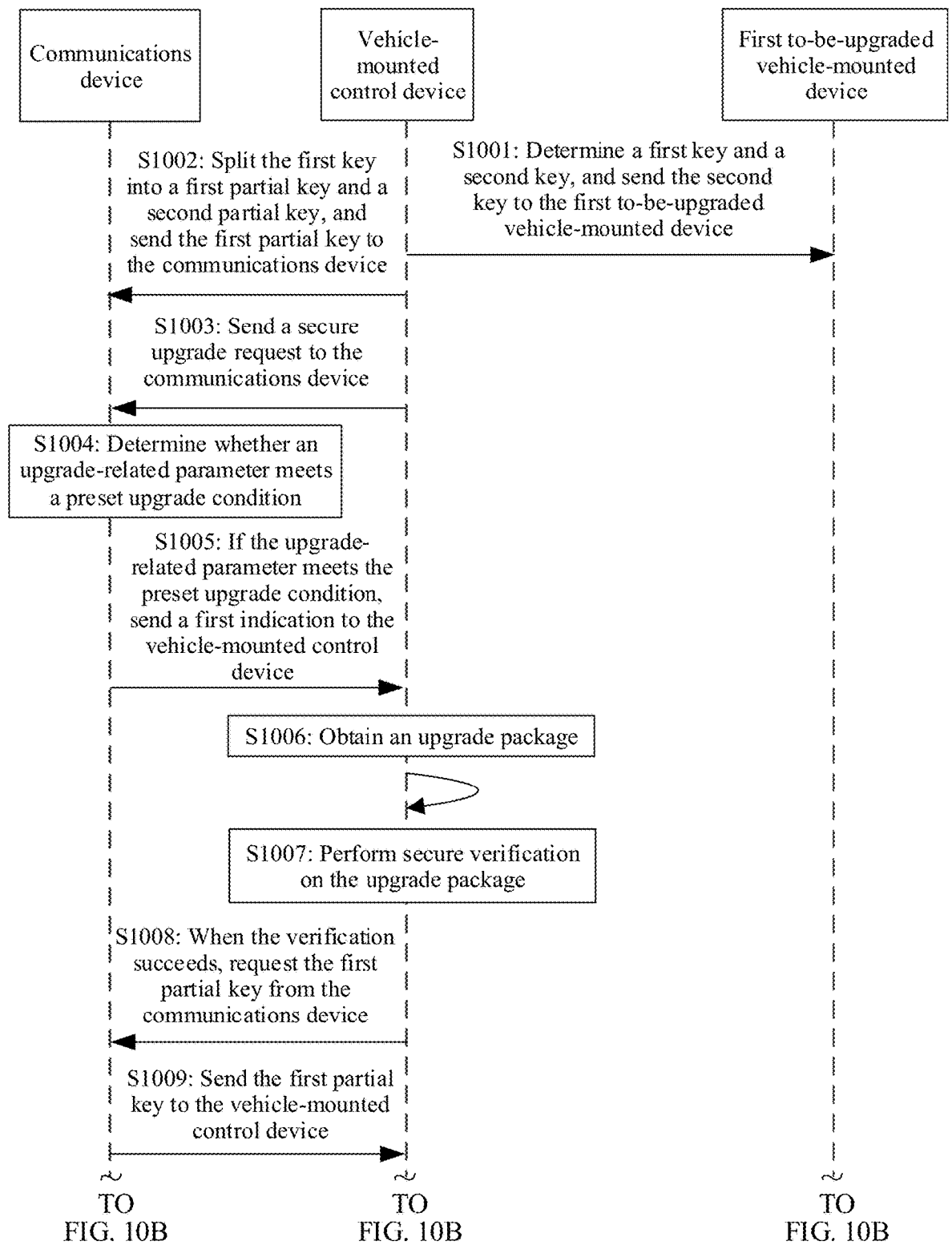
FIG. 10A and FIG. 10B are a schematic flowchart of another vehicle-mounted device upgrade method according to an embodiment of the present disclosure.
Figure 10B:

FIG. 10A and FIG. 10B are a schematic flowchart of another vehicle-mounted device upgrade method according to an embodiment of the present disclosure. The vehicle-mounted device upgrade method is applied to a vehicle upgrade system (including the foregoing architecture 1 and architecture 2), and is applicable to any one of the foregoing application scenarios in FIG. 1 to FIG. 3. The vehicle upgrade system includes an intelligent vehicle and a communications device, and the intelligent vehicle includes a vehicle-mounted control device. The following provides description from a perspective of interaction between the intelligent vehicle and the communications device with reference to FIG. 10A and FIG. 10B. The method may include the following step S1001 to step S1012.

Step S1001. The vehicle-mounted control device determines a first key and a second key, and sending the second key to a first to-be-upgraded vehicle-mounted device.

Specifically, the vehicle-mounted control device determines shared keys transmitted in the vehicle, and the shared keys are the first key and the second key that match. When the shared keys are symmetric keys, the first key and the second key are the same. When the shared keys are asymmetric keys, the first key and the second key are a key pair. After determining the shared keys in the vehicle-mounted device, the vehicle-mounted control device sends the second key to the first to-be-upgraded vehicle-mounted device, and retains the first key. In this way, in subsequent secure intra-vehicle transmission, the vehicle-mounted control device performs secure processing by using the first key, and the first to-be-upgraded vehicle-mounted device performs secure verification by using the second key, where the secure verification is an inverse operation of the secure processing. In this embodiment of the present disclosure, before the first key on the intelligent vehicle is split and stored, the vehicle-mounted control device needs to first determine a key pair used in the vehicle, and send the key pair to the corresponding to-be-upgraded vehicle-mounted device. In this way, subsequently, the vehicle-mounted control device performs secure processing on an upgrade file by using the first key negotiated with the to-be-upgraded vehicle-mounted device, and the to-be-upgraded vehicle-mounted device performs secure verification by using the negotiated and matched second key, to ensure intra-vehicle transmission security of the upgrade file.

Step S1002: The vehicle-mounted control device splits the first key into a first partial key and a second partial key, and sends the first partial key to the communications device. The communications device receives the first partial key sent by the vehicle-mounted control device.

Specifically, the vehicle-mounted control device splits the first key into the first partial key and the second partial key, and sends the first partial key to the communications device. After receiving the first partial key, the communications device stores the first partial key on the communications device. In this case, the vehicle-mounted control device side may delete the first partial key. In other words, a case that the first partial key and the second partial key are stored on a same device and are easily stolen by an unauthorized user is avoided. In this embodiment of the present disclosure, before the first key on the intelligent vehicle is split and stored, the vehicle-mounted control device negotiates with the to-be-upgraded vehicle-mounted device about the first key and the second key. Then, the vehicle-mounted control device splits the first key, sends a part of the key to the matched communications device for storage, and stores the other part of the key, to avoid the key from being easily intercepted and tampered with at a time.

It should be noted that, the two operations of sending, by the vehicle-mounted control device, the second key to the first to-be-upgraded vehicle-mounted device and splitting the first key and sending the first partial key to the communications device are not subject to a specific time sequence. This is not specifically limited in this embodiment of the present disclosure.

Step S1003: The vehicle-mounted control device sends a secure upgrade request to the communications device, where the secure upgrade request includes an upgrade-related parameter of the intelligent vehicle. The communications device receives the secure upgrade request sent by the vehicle-mounted control device.

Specifically, the vehicle-mounted device needs to initiate related authentication for secure upgrade to the communications device before upgrade, and send a current related parameter (a related parameter of firmware/software) of the intelligent vehicle to the communications device for determining, to avoid waste of transmission resources and upgrade resources due to blind upgrade performed when an upgrade condition is not met. For example, when the communications device serves as a verifier, a vehicle-mounted OTA orchestrator is required to perform attestation (hardware/software based) or another reporting mechanism, to ensure integrity of the vehicle-mounted OTA orchestrator or ensure that the vehicle is in a secure and upgradable state. If the attestation or verification fails, an error is reported and the upgrade is terminated. Similarly, the vehicle-mounted OTA orchestrator may also check whether the communications device is in a secure and upgradable state.

Step S1004: The communications device determines whether the upgrade-related parameter meets a preset upgrade condition.

Specifically, the communications device may determine, according to a specific related standard, whether the upgrade-related parameter meets the related upgrade condition.

Step S1005: If the upgrade-related parameter meets the preset upgrade condition, the communications device sends a first indication to the vehicle-mounted control device. The first indication is used to trigger the vehicle-mounted control device to obtain the upgrade package from the terminal device or an upgrade server. The vehicle-mounted control device receives the first indication sent by the communications device.

Specifically, when determining that the upgrade condition is met for the intelligent vehicle, the communications device sends the first indication to the intelligent vehicle. The first indication is used to indicate that the vehicle-mounted control device may initiate upgrade, that is, may obtain the upgrade package. The upgrade package may already be downloaded (e.g., when the terminal device detects that an upgrade package is updated, or when the terminal device is currently connected to a Wi-Fi network) before the communications device requests the upgrade package. In this case, the communications device directly obtains the upgrade package from the terminal device. Alternatively, the vehicle-mounted control device may directly obtain the upgrade package from the upgrade server. In this embodiment of the present disclosure, only when the communications device determines, based on the upgrade-related parameter fed back by the vehicle-mounted control device in the intelligent vehicle, that the upgrade condition is currently met for the intelligent vehicle, the communications device indicates or triggers the vehicle-mounted control device in the intelligent vehicle to obtain the in-vehicle upgrade package, to improve a success rate of in-vehicle upgrade. It can be understood that the intelligent vehicle may obtain the upgrade package from the server; or may obtain the downloaded upgrade package from the communications device, and in this case, the communications device may be the terminal device.

Step S1006: The vehicle-mounted control device obtains the upgrade package, where the upgrade package includes the first upgrade file.

Specifically, the upgrade package may include a plurality of upgrade files, and each upgrade file is used to upgrade at least one to-be-upgraded vehicle-mounted device. In other words, the to-be-upgraded vehicle-mounted device in the in-vehicle system may correspond to one or more upgrade files. The upgrade package includes at least the first upgrade file of the first to-be-upgraded vehicle-mounted device.

Step S1007: The vehicle-mounted control device performs secure verification on the upgrade package.

Specifically, after obtaining the upgrade package, the vehicle-mounted control device further performs secure verification on the upgrade package. secure verification may include verifying a signature, decrypting an upgrade package, and the like. A related key may be negotiated in advance by the upgrade server and the intelligent vehicle, or may be obtained by the intelligent vehicle from the key server. In other words, the related key may be obtained when either of the foregoing architecture 1 and architecture 2 is applied. In this embodiment of the present disclosure, before obtaining partial key that is separately stored, the vehicle-mounted control device first needs to obtain the upgrade package including the upgrade file, and performs secure verification on the upgrade package. After the verification succeeds, the vehicle-mounted control device initiates a procedure of performing secure processing on the corresponding upgrade file and transmitting the upgrade file to the corresponding to-be-upgraded vehicle-mounted device. Only in this case, the vehicle-mounted control device requests, from the communications device, the partial key used to perform secure processing on the upgrade file. This avoids untimely obtaining of the first partial key when it is not determined whether the in-vehicle upgrade package is secure, to avoid unauthorized obtaining, and further improve security of in-vehicle upgrade.

Step S1008: When the verification succeeds, the vehicle-mounted control device requests the first partial key from the communications device. The communications device receives a first partial key request sent by the vehicle-mounted control device.

Specifically, after verifying security of the upgrade package, the vehicle-mounted control device may start to securely transmit the upgrade file in the upgrade package to the corresponding to-be-upgraded vehicle-mounted control device in the vehicle. A longer time for which the first partial key and the second partial key are stored on a same device indicates a higher probability that the first partial key and the second partial key are easily stolen or tampered with by an unauthorized user at a time. Therefore, after secure authentication completed between the vehicle-mounted control device and the communications device, the vehicle-mounted control device obtains the upgrade package and verifies security of the upgrade package, and then requests the first partial key from the communications device.

Step S1009: The communications device sends the first partial key to the vehicle-mounted control device. The vehicle-mounted control device receives the first partial key sent by the communications device.

In a possible implementation, before the communications device sends the first partial key, the vehicle-mounted control device and the communications device perform secure authentication on each other to establish a secure cooperation channel. That the vehicle-mounted control device receives the first partial key sent by the communications device is specifically: receiving, by the vehicle-mounted control device through the secure channel, the first partial key sent by the communications device. In other words, it is ensured that data is sent and received between the vehicle-mounted control device and the communications device through the secure channel. In this embodiment of the present disclosure, the secure channel is established between the vehicle-mounted control device and the matched communications device. In this way, subsequently, the first partial key request, a secure authentication request, and the like may be transmitted between the vehicle-mounted control device and the communications device through the secure channel, to further ensure secure transmission between the vehicle-mounted control device and the communications device.

Step S1010: The vehicle-mounted control device restores the first key by using the first partial key and the second partial key that is stored on the vehicle-mounted control device.

Step S1011: The vehicle-mounted control device performs secure processing on the first upgrade file by using the first key, to obtain the securely processed first upgrade file.

For step S1010 and step S1011, refer to step S902 and step S903 in the embodiment in FIG. 9.

Step S1012: The vehicle-mounted control device sends the securely processed first upgrade file to the first to-be-upgraded vehicle-mounted device.

Specifically, although both the vehicle-mounted control device and the to-be-upgraded vehicle-mounted device are in the intelligent vehicle, interception or tampering may occur during transmission between the two devices. However, if the foregoing secure processing and secure verification processes in this embodiment of the present disclosure are used, secure intra-vehicle transmission and upgrade can be ensured.

Step S1013: The first to-be-upgraded vehicle-mounted device performs, by using the second key that is stored on the vehicle-mounted control device, secure verification on the securely processed first upgrade file, where the second key is a key that pre-matches the first key.

Specifically, the first to-be-upgraded vehicle-mounted device performs, by using the second key shared by the vehicle-mounted control device in a key sharing phase, secure verification on the securely processed first upgrade file, where the secure verification is an inverse operation of the secure processing.

Step S1014: If the verification succeeds, the first to-be-upgraded vehicle-mounted device performs upgrade based on the first upgrade file that is successfully verified.

Specifically, if the verification succeeds, it indicates that the received first upgrade file is secure and authorized, and therefore, secure upgrade may be performed. In this embodiment of the present disclosure, after restoring the first key by using partial keys that are separately stored, the vehicle-mounted control device performs secure processing on the upgrade file, to securely transmit the securely processed upgrade file to the corresponding to-be-upgraded vehicle-mounted device for secure upgrade. This ensures security of the upgrade file during transmission between the vehicle-mounted control device and the to-be-upgraded vehicle-mounted device in the intelligent vehicle.

Step S1015: After the first to-be-upgraded vehicle-mounted device is successfully upgraded, the vehicle-mounted control device indicates the communications device to update a rollback file of the first upgrade file.

Specifically, when the to-be-upgraded vehicle-mounted device is successfully upgraded, the upgraded vehicle-mounted device may provide, to the vehicle-mounted control device, feedback information indicating that the upgrade succeeds. In this case, the vehicle-mounted control device may further perform compatibility detection on a system after the upgrade. After the detection succeeds, it indicates that the upgrade succeeds, and the upgraded vehicle-mounted device is compatible with the vehicle upgrade system. Therefore, the vehicle-mounted control device may indicate the communications device to update the rollback file in the case of current successful upgrade, so that the rollback file can be obtained when the upgrade file is re-obtained next time. In this way, storage on the intelligent vehicle may be extended through a storage capability of the communications device.

Step S1016: After the first to-be-upgraded vehicle-mounted device fails to be upgraded, the vehicle-mounted control device obtains a rollback file of the first upgrade file from the communications device, and sends the rollback file to the first to-be-upgraded vehicle-mounted device for a rollback operation.

Specifically, when the to-be-upgraded vehicle-mounted device fails to be upgraded, the to-be-upgraded vehicle-mounted device may provide feedback information indicating an upgrade failure to the vehicle-mounted control device, where the upgrade failure may include that the upgrade file is successfully upgraded but fails to pass a system compatibility test. In this case, the vehicle-mounted control device may obtain the rollback file from the communications device (it may be understood that the communications device stores the rollback file of the first upgrade file), and send the rollback file to the first vehicle-mounted control device for a rollback operation. In this embodiment of the present disclosure, the communications device may provide the rollback file of the upgrade file for the intelligent vehicle. Regardless of whether the to-be-upgraded vehicle-mounted device is successfully upgraded or not, the communications device can perform a rollback operation on the current upgrade file, so that the to-be-upgraded vehicle-mounted device may refer to the rollback file during subsequent upgrade.

In this embodiment of the present disclosure, the beneficial effects of the embodiment corresponding to FIG. 9 is also presented. Further, upgrade efficiency of the intelligent vehicle is improved through a secure authentication interaction process between the communications device and the intelligent vehicle. In addition, the communications device may further provide an upgrade package download service, a rollback service, and the like for the to-be-upgraded vehicle-mounted device. The communications device off-loads transmission and storage workload from the vehicle-mounted control device, enhances an entire upgrade process, and provides a secure and effective upgrade service.

The foregoing describes in detail the method in the embodiments of the present disclosure, and the following provides a related apparatus in the embodiments of the present disclosure.

Figure 11:
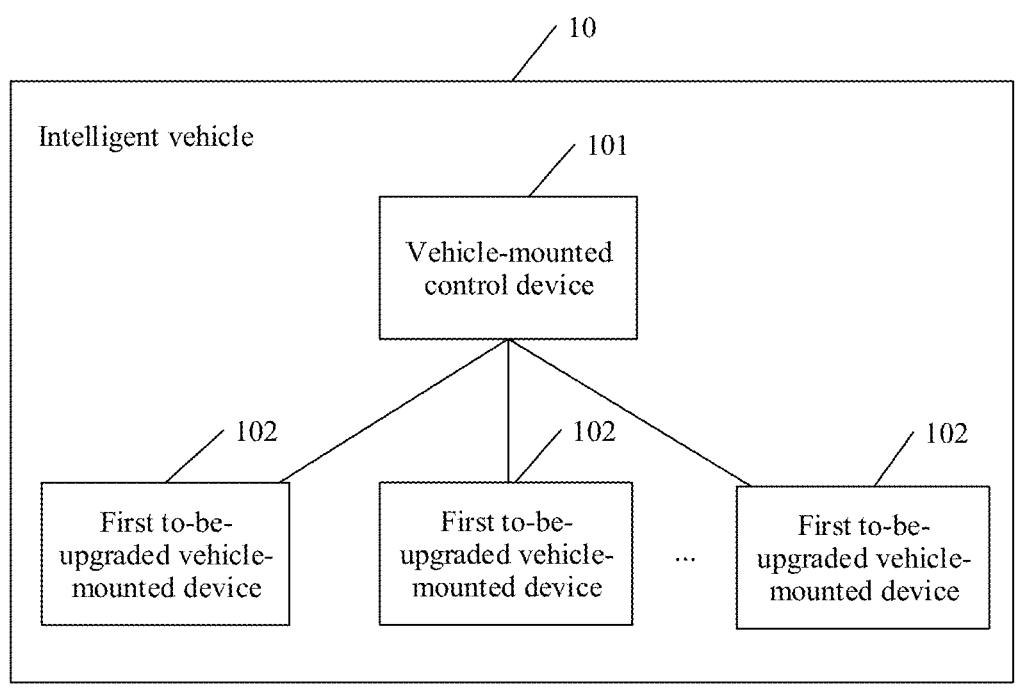
FIG. 11 is a schematic structural diagram of an intelligent vehicle according to an embodiment of the present disclosure.

FIG. 11 is a schematic structural diagram of an intelligent vehicle according to an embodiment of the present disclosure. The intelligent vehicle is applied to a vehicle upgrade system. The vehicle upgrade system includes the intelligent vehicle and a communications device. The intelligent vehicle 10 includes a vehicle-mounted control device 101.

The vehicle-mounted control device 101 is configured to: receive a first partial key sent by the communications device, restore a first key by using the first partial key and a second partial key that is stored on the vehicle-mounted control device; and then perform secure processing on a first upgrade file by using the first key, to obtain the securely processed first upgrade file. The secure processing includes generating first message authentication code (MAC), and the securely processed first upgrade file includes the first upgrade file and the first MAC.

In a possible implementation, the intelligent vehicle further includes at least one first to-be-upgraded vehicle-mounted device 102 (alternatively, a plurality of first to-be-upgraded vehicle-mounted devices are used, as an example, in FIG. 11).

The vehicle-mounted control device 101 is further configured to send the securely processed first upgrade file to the first to-be-upgraded vehicle-mounted device 102.

The first to-be-upgraded vehicle-mounted device 102 is configured to: perform, by using a second key that is stored on the vehicle-mounted control device, secure verification on the securely processed first upgrade file; and if the verification succeeds, perform upgrade based on the first upgrade file that is successfully verified. The second key is a key that pre-matches the first key, and the secure verification is an inverse operation of the secure processing.

In a possible implementation, the secure processing further includes encrypting the first upgrade file and the first MAC by using the first key, and the securely processed first upgrade file includes the first upgrade file and the first MAC that are encrypted by using the first key.

In a possible implementation, the vehicle-mounted control device 101 is further configured to:
before receiving the first partial key sent by the communications device, determine the first key and the second key, and send the second key to the first to-be-upgraded vehicle-mounted device.

In a possible implementation, the vehicle-mounted control device 101 is further configured to:
before receiving the first partial key sent by the communications device, split the first key into the first partial key and the second partial key, and send the first partial key to the communications device.

In a possible implementation, the vehicle-mounted control device 101 is further configured to:
obtain an upgrade package before receiving the first partial key sent by the communications device, perform secure verification on the upgrade package, and when the verification succeeds, request the first partial key from the communications device, where the upgrade package includes the first upgrade file.

In a possible implementation, the communications device includes a terminal device; and the vehicle-mounted control device 101 is further configured to:
before obtaining the upgrade package, send a secure upgrade request to the communications device, where the secure upgrade request includes an upgrade-related parameter of the intelligent vehicle; and when the upgrade-related parameter meets a preset upgrade condition, receive a first indication sent by the communications device, where the first indication is used to trigger the vehicle-mounted control device to obtain the upgrade package from the terminal device or an upgrade server.

In a possible implementation, the vehicle-mounted control device 101 is further configured to perform, with the communications device, secure authentication on each other to establish a secure cooperation channel.

The vehicle-mounted control device 101 is specifically configured to:
receive, through the secure channel, the first partial key sent by the communications device.

In a possible implementation, the vehicle-mounted control device 101 is further configured to:
after the first to-be-upgraded vehicle-mounted device is successfully upgraded, indicate the communications device to update a rollback file of the first upgrade file; and/or
after the first to-be-upgraded vehicle-mounted device fails to be upgraded, obtain a rollback file of the first upgrade file from the communications device, and send the rollback file to the first to-be-upgraded vehicle-mounted device for a rollback operation.

It should be noted that, for the vehicle-mounted control device 101 and the first to-be-upgraded vehicle-mounted device 102 in the intelligent vehicle 10 described in this embodiment of the present disclosure, refer to related descriptions of the vehicle-mounted control device and the first to-be-upgraded vehicle-mounted device in the method embodiments described in FIG. 9, and FIG. TOA and FIG. 10B. Details are not described herein again.

It can be understood that, the intelligent vehicle 10 may further integrate an intelligent driving system, a life service system, a safety protection system, a positioning service system, a car service system, and other functions by using a computer, modern sensing, information convergence, communications, artificial intelligence, automatic control, or other technologies. This is not specifically limited in this application, and details are not described herein.

Figure 12:
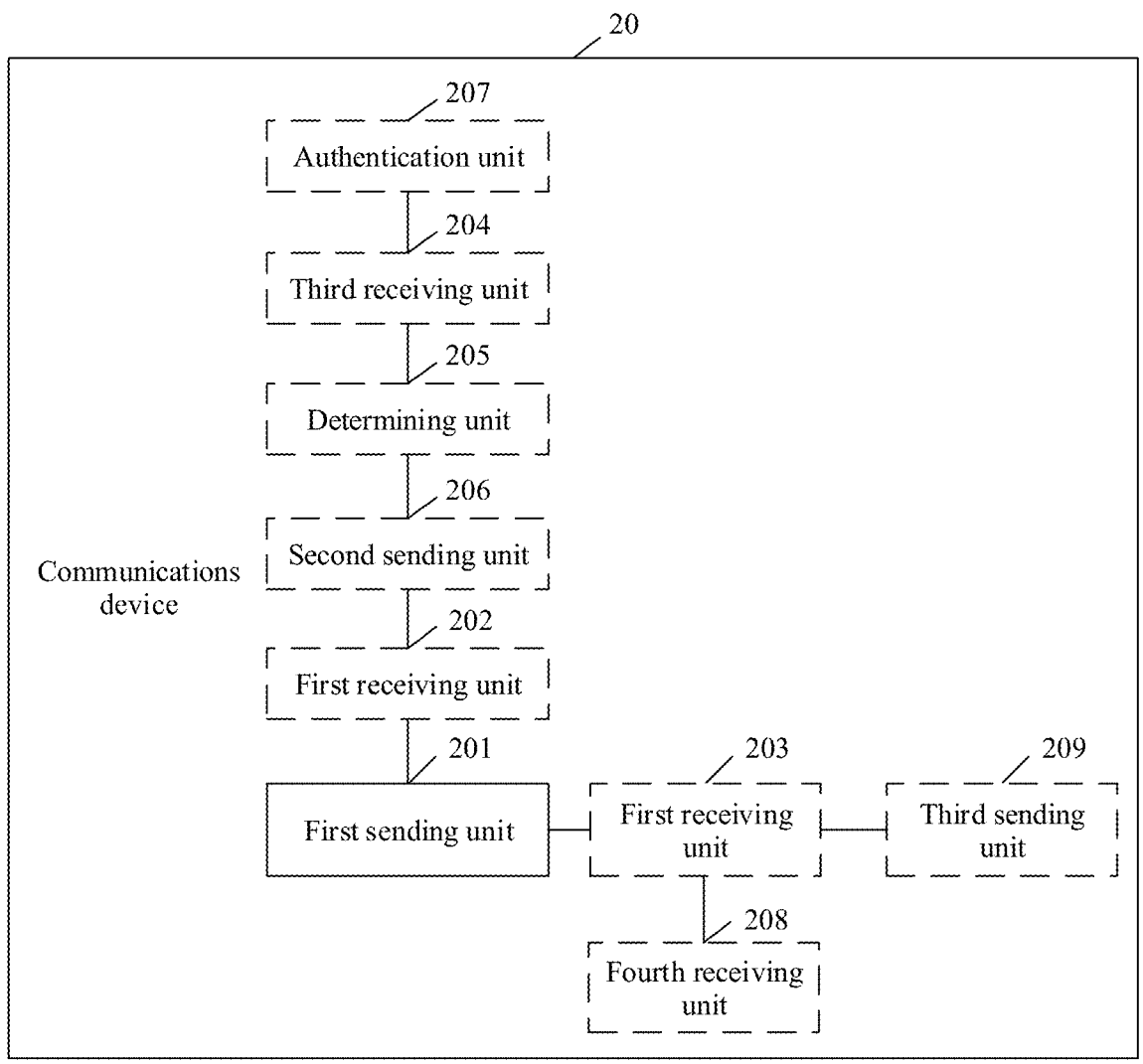
FIG. 12 is a schematic structural diagram of a communications device according to an embodiment of the present disclosure.

FIG. 12 is a schematic structural diagram of a communications device according to an embodiment of the present disclosure. The communications device 20 is applied to a vehicle upgrade system. The vehicle upgrade system includes an intelligent vehicle and the communications device, and the intelligent vehicle includes a vehicle-mounted control device. Detailed descriptions of units of the communications device 20 are as follows:

A first sending unit 201 is configured to send a first partial key to the vehicle-mounted control device. The vehicle-mounted control device restores a first key by using the first partial key and a second partial key that is stored on the vehicle-mounted control device. The first key is used by the vehicle-mounted control device to perform secure processing on a first upgrade file, to obtain the securely processed first upgrade file. The secure processing includes generating first message authentication code (MAC). The securely processed first upgrade file includes the first upgrade file and the first MAC.

In a possible implementation, the vehicle-mounted control device splits the first key into the first partial key and the second partial key. The communications device 20 further includes:

a first receiving unit 202, configured to: before the first partial key is sent to the vehicle-mounted control device, receive the first partial key sent by the vehicle-mounted control device.

In a possible implementation, the communications device 20 further includes:

a second receiving unit 203, configured to: before the first partial key is sent to the vehicle-mounted control device, receive a first partial key request sent by the vehicle-mounted control device. The first partial key request is sent by the vehicle-mounted control device when secure verification performed by the vehicle-mounted control device on an upgrade package succeeds, and the upgrade package includes the first upgrade file.

In a possible implementation, the communications device is a terminal device, and the communications device 20 further includes:

a third receiving unit 204, configured to: before the first partial key request sent by the vehicle-mounted control device is received, receive a secure upgrade request sent by the vehicle-mounted control device, where the secure upgrade request includes an upgrade-related parameter of the intelligent vehicle;

a determining unit 205, configured to determine whether the upgrade-related parameter meets a preset upgrade condition; and a second sending unit 206, configured to: if the upgrade-related parameter meets the preset upgrade condition, send a first indication to the vehicle-mounted control device, where the first indication is used to trigger the vehicle-mounted control device to obtain the upgrade package from the terminal device or an upgrade server.

In a possible implementation, the communications device 20 further includes:

an authentication unit 207, configured to perform, with the vehicle-mounted control device, secure authentication on each other to establish a secure cooperation channel.

The first sending unit 201 is specifically configured to: send the first partial key to the vehicle-mounted control device through the secure channel.

In a possible implementation, the communications device 20 further includes:

a fourth receiving unit 208, configured to: after the first to-be-upgraded vehicle-mounted device is successfully upgraded, receive an indication, sent by the vehicle-mounted control device, indicating to update a rollback file of the first upgrade file; and/or a third sending unit 209, configured to: after the first to-be-upgraded vehicle-mounted device fails to be upgraded, send a rollback file of the first upgrade file to the vehicle-mounted control device, so that the first to-be-upgraded vehicle-mounted device performs a rollback operation.

It should be noted that, for functions of the functional units in the communications device 20 described in this embodiment of the present disclosure, refer to related descriptions of the communications device in the method embodiments in FIG. 9, and FIG. 10A and FIG. 10B. Details are not described herein again.

Figure 13:
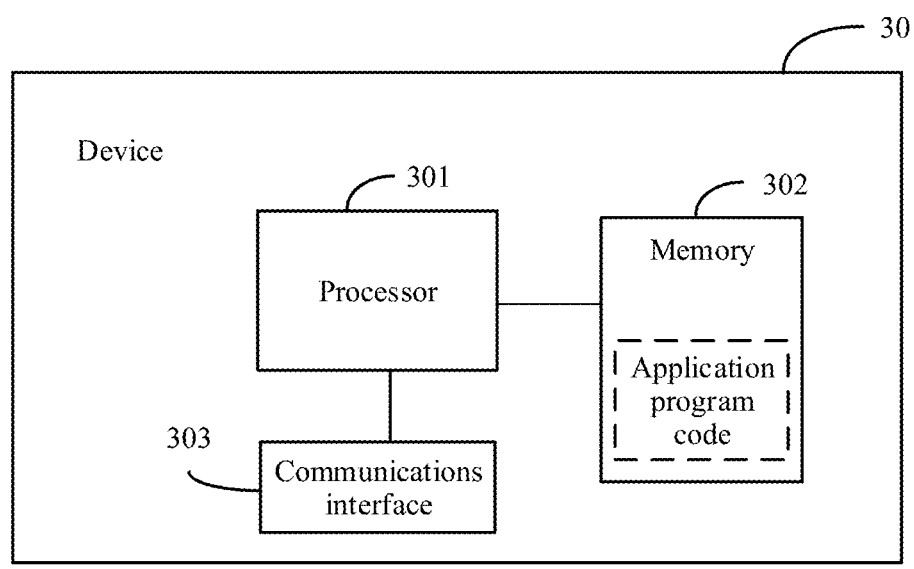
FIG. 13 is a schematic structural diagram of a device according to an embodiment of the present disclosure.

FIG. 13 is a schematic structural diagram of a device according to an embodiment of the present disclosure. The vehicle-mounted control device 101 and the first to-be-upgraded vehicle-mounted device 102 in the intelligent vehicle 10, and the communications device 20 may all be implemented by using a structure in FIG. 13. The device 30 includes at least one processor 301, at least one memory 302, and at least one communications interface 303. In addition, the device may further include general-purpose components such as an antenna, and details are not described herein.

The processor 301 may be a general-purpose central processing unit (CPU), a microprocessor, an application-specific integrated circuit (ASIC), or one or more integrated circuits configured to control program execution of the foregoing solutions.

The communications interface 303 is used for communication with another device or a communications network, for example, an upgrade server, a key server, or an intra-vehicle device.

The memory 302 may be a read-only memory (ROM) or another type of static storage device capable of storing static information and an instruction, or a random access memory (RAM) or another type of dynamic storage device capable of storing information and an instruction. Alternatively, the memory 302 may be an electrically erasable programmable read-only memory (EEPROM), a compact disc read-only memory (CD-ROM) or other optical disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure form and that can be accessed by a computer. However, the memory 302 is not limited thereto. The memory may exist independently, and is connected to the processor through the bus. Alternatively, the memory may be integrated with the processor.

The memory 302 is configured to store application program code for executing the foregoing solution, and the processor 301 controls the execution. The processor 301 is configured to execute the application program code stored in the memory 302.

When the device shown in FIG. 13 is the vehicle-mounted control device 101, the code stored in the memory 302 may be used to perform actions of the vehicle-mounted control device in the vehicle-mounted device upgrade method provided in FIG. 9. For example, the code may be used to perform the following actions: receiving the first partial key sent by the communications device; restoring a first key by using the first partial key and a second partial key that is stored on the vehicle-mounted control device; and performing secure processing on a first upgrade file by using the first key, to obtain the securely processed first upgrade file.

When the device shown in FIG. 13 is the first to-be-upgraded vehicle-mounted device 102, the code stored in the memory 302 may be used perform actions of the first to-be-upgraded vehicle-mounted device in the vehicle-mounted device upgrade method provided in FIG. 10A and FIG. 10B. For example, the code may be used to perform the following actions: performing, by using the second key that is stored on the vehicle-mounted control device, secure verification on the securely processed first upgrade file, where the second key is a key that pre-matches the first key, and the secure verification is an inverse operation of the secure processing; and if the verification succeeds, performing upgrade based on the first upgrade file that is successfully verified.

It should be noted that, for functions of the vehicle-mounted control device 101 and the first to-be-upgraded vehicle-mounted device 102 described in this embodiment of the present disclosure, refer to related descriptions in the method embodiments in FIG. 9, and FIG. 10A and FIG. 10B. Details are not described herein again.

When the device shown in FIG. 13 is the communications device 20, the code stored in the memory 302 may be used to perform an action of the communications device in the vehicle-mounted device upgrade method provided in FIG. 9 or FIG. 10A and FIG. 10B. For example, the code may be used to perform the following action: sending a first partial key to the vehicle-mounted control device. The vehicle-mounted control device restores a first key by using the first partial key and a second partial key that is stored on the vehicle-mounted control device. The first key is used by the vehicle-mounted control device to perform secure processing on a first upgrade file, to obtain the securely processed first upgrade file that is successfully verified.

It should be noted that, for functions of the communications device 20 described in this embodiment of the present disclosure, refer to related descriptions in the method embodiments in FIG. 9, and FIG. 10A and FIG. 10B. Details are not described herein again.

The embodiments of the present disclosure further provide a computer storage medium, and the computer storage medium may store a program. When the program is executed, some or all of the steps of any one the methods in the foregoing method embodiments may be performed.

An embodiment of the present disclosure further provides a computer program, and the computer program includes an instruction. When the computer program is executed by a computer, the computer is enabled to perform some or all of the steps of any one of the vehicle-mounted device upgrade methods.

In the foregoing embodiments, the description of each embodiments has respective focuses. For a part that is not described in detail in an embodiment, refer to related descriptions in other embodiments.

It should be noted that, for brief description, the foregoing method embodiments are represented as a series of actions. However, persons skilled in the art should appreciate that this application is not limited to the described order of the actions, because according to this application, some steps may be performed in another order or simultaneously. It should be further appreciated by persons skilled in the art that the embodiments described in this specification all belong to exemplary embodiments, and the involved actions and modules are not necessarily required by this application.

In the several embodiments provided in this application, it should be understood that the disclosed apparatus may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form or other forms.

The foregoing units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like, and may be specifically a processor in a computer device) to perform some or all of the steps of the methods described in the embodiments of this application. The foregoing storage medium may include: any medium that can store program code, such as a USB flash drive, a removable hard disk, a magnetic disk, an optical disc, a read-only memory (ROM), or a random access memory (RAM).

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A vehicle-mounted device upgrade method, applied to a vehicle upgrade system that comprises an intelligent vehicle and a communications device, wherein the intelligent vehicle comprises a vehicle-mounted control device and a first to-be-upgraded vehicle-mounted device, and the method comprises:

receiving, by the vehicle-mounted control device, a first partial key sent by the communications device;

restoring, by the vehicle-mounted control device, a first key by using the first partial key and a second partial key that is stored on the vehicle-mounted control device;

performing, by the vehicle-mounted control device, secure processing on a first upgrade file by using the first key, to obtain a securely processed first upgrade file, wherein the secure processing comprises generating a first message authentication code (MAC), and the securely processed first upgrade file comprises the first upgrade file and the first MAC;

attempting to upgrade the first to-be-upgraded vehicle-mounted device; and responsive to determining that the first to-be-upgraded vehicle-mounted device is successfully upgraded, indicating, by the vehicle-mounted control device, the communications device to update a rollback file of the first upgrade file; or responsive to determining that the first to-be-upgraded vehicle-mounted device fails to be upgraded, obtaining, by the vehicle-mounted control device, a rollback file of the first upgrade file from the communications device, and sending the rollback file to the first to-be-upgraded vehicle-mounted device for a rollback operation.

2. The method according to claim 1, wherein the method further comprises:

sending, by the vehicle-mounted control device, the securely processed first upgrade file to the first to-be-upgraded vehicle-mounted device;

performing, by the first to-be-upgraded vehicle-mounted device by using a second key that is stored on the vehicle-mounted control device, secure verification on the securely processed first upgrade file, wherein the second key is a key that pre-matches the first key, and the secure verification is an inverse operation of the secure processing; and responsive to determining that the verification succeeds, performing, by the first to-be-upgraded vehicle-mounted device, upgrade based on the first upgrade file that is successfully verified.

3. The method according to claim 1, wherein the secure processing further comprises encrypting the first upgrade file and the first MAC by using the first key, and the securely processed first upgrade file comprises the first upgrade file and the first MAC that are encrypted by using the first key.

4. The method according to claim 1, wherein before the receiving, by the vehicle-mounted control device, the first partial key sent by the communications device, the method further comprises:

determining, by the vehicle-mounted control device, the first key and the second key, and sending the second key to the first to-be-upgraded vehicle-mounted device.

5. The method according to claim 4, wherein before the receiving, by the vehicle-mounted control device, the first partial key sent by the communications device, the method further comprises:

splitting, by the vehicle-mounted control device, the first key into the first partial key and the second partial key, and sending the first partial key to the communications device.

6. The method according to claim 1, wherein before the receiving, by the vehicle-mounted control device, the first partial key sent by the communications device, the method further comprises:

obtaining, by the vehicle-mounted control device, an upgrade package, wherein the upgrade package comprises the first upgrade file;

performing, by the vehicle-mounted control device, secure verification on the upgrade package; and responsive to determining that the secure verification on the upgrade package succeeds, requesting, by the vehicle-mounted control device, the first partial key from the communications device.

7. The method according to claim 6, wherein the communications device comprises a terminal device, and before the obtaining, by the vehicle-mounted control device, the upgrade package, the method further comprises:

sending, by the vehicle-mounted control device, a secure upgrade request to the communications device, wherein the secure upgrade request comprises an upgrade-related parameter of the intelligent vehicle; and responsive to determining that the upgrade-related parameter meets a preset upgrade condition, receiving, by the vehicle-mounted control device, a first indication sent by the communications device, wherein the first indication is used to trigger the vehicle-mounted control device to obtain the upgrade package from the terminal device or an upgrade server.

8. The method according to claim 1, wherein the method further comprises:

performing, by the vehicle-mounted control device, secure authentication of the communications device to establish a secure cooperation channel; and wherein the receiving, by the vehicle-mounted control device, a first partial key sent by the communications device comprises:

receiving, by the vehicle-mounted control device through the secure channel, the first partial key sent by the communications device.

9. A vehicle-mounted device upgrade method, applied to a vehicle upgrade system, wherein the vehicle upgrade system comprises an intelligent vehicle and a communications device, the intelligent vehicle comprises a vehicle-mounted control device and a first to-be-upgraded vehicle-mounted device, and the method comprises:

sending, by the communications device, a first partial key to the vehicle-mounted control device, wherein the vehicle-mounted control device restores a first key by using the first partial key and a second partial key that is stored on the vehicle-mounted control device; the first key is used by the vehicle-mounted control device to perform secure processing on a first upgrade file, to obtain a securely processed first upgrade file; the secure processing comprises generating a first message authentication code (MAC); and the securely processed first upgrade file comprises the first upgrade file and the first MAC;

attempting to upgrade the first to-be-upgraded vehicle-mounted device; and responsive to determining that the first to-be-upgraded vehicle-mounted device is successfully upgraded, receiving, by the communications device, an indication, sent by the vehicle-mounted control device, indicating to update a rollback file of the first upgrade file; or responsive to determining that the first to-be-upgraded vehicle-mounted device fails to be upgraded, sending, by the communications device, a rollback file of the first upgrade file to the vehicle-mounted control device, so that the first to-be-upgraded vehicle-mounted device performs a rollback operation.

10. The method according to claim 9, wherein the vehicle-mounted control device splits the first key into the first partial key and the second partial key, and before the sending, by the communications device, the first partial key to the vehicle-mounted control device, the method further comprises:
   receiving, by the communications device, the first partial key sent by the vehicle-mounted control device.

11. The method according to claim 9, wherein before the sending, by the communications device, the first partial key to the vehicle-mounted control device, the method further comprises:
   receiving, by the communications device, a first partial key request sent by the vehicle-mounted control device, wherein the first partial key request is sent by the vehicle-mounted control device when secure verification performed by the vehicle-mounted control device on an upgrade package succeeds, and the upgrade package comprises the first upgrade file.

12. The method according to claim 11, wherein the communications device comprises a terminal device; and before the receiving, by the communications device, the first partial key request sent by the vehicle-mounted control device, the method further comprises:
   receiving, by the communications device, a secure upgrade request sent by the vehicle-mounted control device, wherein the secure upgrade request comprises an upgrade-related parameter of the intelligent vehicle;
   determining, by the communications device, whether the upgrade-related parameter meets a preset upgrade condition; and
   responsive to determining that the upgrade-related parameter meets the preset upgrade condition, sending, by the communications device, a first indication to the vehicle-mounted control device, wherein the first indication is used to trigger the vehicle-mounted control device to obtain the upgrade package from the terminal device or an upgrade server.

13. The method according to claim 9, wherein the method further comprises:
   performing, by the communications device and the vehicle-mounted control device, secure authentication on each other to establish a secure cooperation channel; and
   wherein the sending, by the communications device, a first partial key to the vehicle-mounted control device comprises:
   sending, by the communications device, the first partial key to the vehicle-mounted control device through the secure channel.

14. An intelligent vehicle, applied to a vehicle upgrade system, wherein the vehicle upgrade system comprises the intelligent vehicle and a communications device, and the intelligent vehicle comprises a vehicle-mounted control device and a first to-be-upgraded vehicle-mounted device; and
   wherein the vehicle-mounted control device is configured to:
   receive a first partial key sent by the communications device;
   restore a first key by using the first partial key and a second partial key that is stored on the vehicle-mounted control device;
   perform secure processing on a first upgrade file by using the first key, to obtain a securely processed first upgrade file, wherein the secure processing comprises generating a first message authentication code (MAC), and the securely processed first upgrade file comprises the first upgrade file and the first MAC;
   attempting to upgrade the first to-be-upgraded vehicle-mounted device; and
   responsive to determining that the first to-be-upgraded vehicle-mounted device is successfully upgraded, indicate the communications device to update a rollback file of the first upgrade file; or
   responsive to determining that the first to-be-upgraded vehicle-mounted device fails to be upgraded, obtain a rollback file of the first upgrade file from the communications device, and send the rollback file to the first to-be-upgraded vehicle-mounted device for a rollback operation.

15. The intelligent vehicle according to claim 14, wherein:
   the vehicle-mounted control device is further configured to send the securely processed first upgrade file to the first to-be-upgraded vehicle-mounted device; and
   the first to-be-upgraded vehicle-mounted device is configured to: perform, by using a second key that is stored on the vehicle-mounted control device, secure verification on the securely processed first upgrade file; and responsive to successful verification of the securely processed first upgrade file, perform upgrade based on the first upgrade file, wherein the second key is a key that pre-matches the first key, and the secure verification is an inverse operation of the secure processing.

16. The intelligent vehicle according to claim 14, wherein the secure processing further comprises encrypting the first upgrade file and the first MAC by using the first key, and the securely processed first upgrade file comprises the first upgrade file and the first MAC that are encrypted by using the first key.

17. The intelligent vehicle according to claim 14, wherein the vehicle-mounted control device is further configured to:
   before receiving the first partial key sent by the communications device, determine the first key and the second key, and send the second key to the first to-be-upgraded vehicle-mounted device.

18. The intelligent vehicle according to claim 17, wherein the vehicle-mounted control device is further configured to:
   before receiving the first partial key sent by the communications device, split the first key into the first partial key and the second partial key, and send the first partial key to the communications device.

* * * * *